United States Patent
Royster et al.

(10) Patent No.: US 10,451,422 B2
(45) Date of Patent: Oct. 22, 2019

(54) SYSTEM AND METHOD FOR PROVIDING PERSISTENT MISSION DATA TO A FLEET OF VEHICLES

(71) Applicant: ROGERSON AIRCRAFT CORPORATION, Irvine, CA (US)

(72) Inventors: Howard I. Royster, Costa Mesa, CA (US); Michael Rogerson, Irvine, CA (US)

(73) Assignee: ROGERSON AIRCRAFT CORPORATION, Irvine, CA (US)

( * ) Notice: Subject to any disclaimer, the term of this patent is extended or adjusted under 35 U.S.C. 154(b) by 70 days.

(21) Appl. No.: 15/499,691

(22) Filed: Apr. 27, 2017

(65) Prior Publication Data

US 2017/0314927 A1 Nov. 2, 2017

Related U.S. Application Data

(60) Provisional application No. 62/329,071, filed on Apr. 28, 2016, provisional application No. 62/329,084, (Continued)

(51) Int. Cl.
*G01C 21/00* (2006.01)
*G01C 21/20* (2006.01)
(Continued)

(52) U.S. Cl.
CPC .......... *G01C 21/005* (2013.01); *G01C 21/20* (2013.01); *G01S 17/023* (2013.01); *G01S 17/89* (2013.01);
(Continued)

(58) Field of Classification Search
CPC .............................. G01C 21/005; G01C 21/20
See application file for complete search history.

(56) References Cited

U.S. PATENT DOCUMENTS

| 6,008,756 A | 12/1999 | Boerhave |
| 7,091,468 B2 | 8/2006 | Rols |

(Continued)

OTHER PUBLICATIONS

Klein, "Sensor and data fusion; a tool for information assessment and decision making," SPIE—The International Society for Optical Engineering; Second Edition; Jul. 7, 2004; 2 pages.

(Continued)

*Primary Examiner* — Jess Whittington
(74) *Attorney, Agent, or Firm* — Pillsbury Winthrop Shaw Pittman LLP

(57) ABSTRACT

The present disclosure pertains to a system for providing persistent mission data to a fleet of vehicles. In some implementations, the system receives (i) information related to a first vehicle's location, the altitude of the first vehicle, and the first vehicle's orientation from the one or more first sensors and (ii) imagery data from one or more second sensors disposed on the first vehicle, wherein the imagery data includes instantaneous imagery and previously recorded imagery. The system geolocates the imagery data based on the first vehicle's altitude and the first vehicle's orientation relative to the terrain. The system transmits one or both of the instantaneous imagery or the previously recorded imagery to a fleet of vehicles. The system effectuates presentation of the imagery data on a three dimensional topographical map of the terrain.

20 Claims, 11 Drawing Sheets

Related U.S. Application Data filed on Apr. 28, 2016, provisional application No. 62/329,080, filed on Apr. 28, 2016.

(51) Int. Cl.
*G01S 17/02* (2006.01)
*G01S 17/89* (2006.01)
*G01S 17/93* (2006.01)
*G08G 5/00* (2006.01)
*G01C 11/06* (2006.01)

(52) U.S. Cl.
CPC .......... *G01S 17/933* (2013.01); *G08G 5/0021* (2013.01); *G08G 5/0086* (2013.01); *G01C 11/06* (2013.01)

(56) References Cited

U.S. PATENT DOCUMENTS

| | | |
|---|---|---|
| 7,158,136 B2 | 1/2007 | Gannon |
| 7,456,779 B2 | 11/2008 | Cross |
| 7,460,148 B1 | 12/2008 | Clark |
| 7,675,461 B1 | 3/2010 | McCusker |
| 7,747,364 B2 | 6/2010 | Roy |
| 8,072,581 B1 | 12/2011 | Breiholz |
| 8,788,128 B1 | 7/2014 | McCusker |
| 8,830,143 B1 | 9/2014 | Pitchford |
| 9,269,239 B1 | 2/2016 | Jensen |
| 2002/0149599 A1 | 10/2002 | Dwyer |
| 2003/0078754 A1 | 4/2003 | Hamza |
| 2007/0005199 A1* | 1/2007 | He .......... G01C 23/00 701/16 |
| 2007/0177819 A1 | 8/2007 | Ma |
| 2007/0297696 A1 | 12/2007 | Hamza |
| 2010/0182323 A1 | 7/2010 | Nuydens |
| 2010/0235129 A1 | 9/2010 | Sharma |
| 2013/0080050 A1* | 3/2013 | McKitterick .......... G01S 13/89 701/466 |
| 2013/0131984 A1 | 5/2013 | Elgersma |
| 2013/0277430 A1 | 10/2013 | Zumsteg |
| 2013/0325215 A1* | 12/2013 | Vos .......... G01C 11/02 701/3 |
| 2014/0146173 A1 | 5/2014 | Joyce et al. |
| 2015/0009072 A1 | 1/2015 | Nijsure |
| 2015/0194060 A1* | 7/2015 | Mannon .......... G08G 5/0078 701/301 |
| 2015/0241220 A1 | 8/2015 | McKitterick |

OTHER PUBLICATIONS

United States Patent and Trademark Office; Non-Final Office Action in related U.S. Appl. 15/499,687 dated Jun. 28, 2019, pp. 1-9.

* cited by examiner

SYSTEM AND METHOD FOR PROVIDING PERSISTENT MISSION DATA TO A FLEET OF VEHICLES

CROSS-REFERENCE TO RELATED APPLICATIONS

This application claims priority and benefit to U.S. Provisional Application No. 62/329,084, filed on Apr. 28, 2016 and entitled "SYSTEMS AND METHODS FOR REAL TIME FUSION DISPLAY PROCESSOR FOR VIEWING IN COCKPIT, CABIN, AND ON THE GROUND," U.S. Provisional Application No. 62/329,071, filed on Apr. 28, 2016 and entitled "SYSTEMS AND METHODS FOR SYNTHESIZED HOVER POSITION AND ATTITUDE CORRECTION," U.S. Provisional Application No. 62/329,075, filed on Apr. 28, 2016 and entitled "SYSTEMS AND METHODS FOR MISSION DATA PERSISTENCE OF FUSION DATA ELEMENTS," and U.S. Provisional Application No. 62/329,080, filed on Apr. 28, 2016 and entitled "SYSTEMS AND METHODS FOR SENSOR PROCESSING, OBJECT, IMPACT, AND MOTION TRACKING, AND FLIGHT DISPLAY PRESENTATION." All of the above-referenced applications are incorporated herein by reference in their entireties.

BACKGROUND

1. Field

The present disclosure pertains to a system and method for providing persistent mission data to a fleet of vehicles.

2. Description of the Related Art

Sensors including visual cameras, infrared cameras, synthetic renderings, and laser scanning systems have been deployed in avionics for several decades. However, an effective way to fuse image data sets obtained from such sensors to form a coherent displayed image, including image content, as well as real time analytics identifying objects, impacts, threats, and object motion to a pilot, a copilot, and/or cabin crew are not available.

SUMMARY

Accordingly, a first aspect of the present disclosure relates to a system and method for determining a synthesized position of a vehicle. The system may comprise one or more first sensors configured to generate output signals conveying information related to a location of the vehicle, a height of the vehicle above a ground surface of terrain around the vehicle, an orientation of the vehicle, and/or other information. The system may comprise one or more second sensors configured to generate output signals conveying information related to imagery data for the terrain around the vehicle and/or other information. The system may comprise one or more processors configured by machine-readable instructions to: receive information related to the vehicle's location, the height above the ground surface of the terrain, and the vehicle's orientation from the one or more first sensors; obtain a three dimensional topographical map of the terrain based on the location of the vehicle, the three dimensional topographical map being divided into a virtual grid, the grid comprising a first vertex, the terrain having a first point corresponding to the first vertex; receive the imagery data from the one or more second sensors, the imagery data comprising a first pixel corresponding to the first point; and determine the synthesized position of the vehicle, the synthesized position relative to the terrain on the three dimensional topographical map, the synthesized position determined by correlating the first pixel to the first vertex, wherein the correlation is based on (i) pixel calibration information, the pixel calibration information comprising an angular relationship between the first pixel and the first vertex, (ii) the vehicle's height, and (iii) the vehicle's orientation.

A second aspect of the present disclosure relates to a system and method for providing terrain imagery during low visibility conditions. The system may comprise one or more sensors configured to generate output signals conveying information related to imagery data for terrain around a vehicle and/or other information. The system may comprise one or more processors configured by machine-readable instructions to: receive information related to meteorological conditions for the environment around the vehicle; obtain a three dimensional topographical map of the terrain around the vehicle based on a location of the vehicle; and effectuate, based on the information related to imagery data in the output signals, a location of the vehicle, and the topographical map, and responsive to the information related to the meteorological conditions around the vehicle indicating low visibility conditions for a vehicle operator, presentation of one or both of simulated views of the terrain around the vehicle and a position of the vehicle on the three dimensional topographical map to the vehicle operator.

A third aspect of present disclosure relates to a system and method for effectuating presentation of a terrain around a vehicle on a display in the vehicle. The system may comprise one or more processors configured by machine-readable instructions to: receive information related to the vehicle's location, the height above the ground surface of the terrain, and the vehicle's orientation from one or more first sensors coupled to the vehicle; obtain a three dimensional topographical map of a terrain around the vehicle based on the location of the vehicle; receive imagery data from one or more second sensors coupled to the vehicle, the imagery data corresponding to the terrain, wherein the imagery data comprises instantaneous imagery and previously recorded imagery, the instantaneous imagery depicting the terrain around the vehicle generated during a current mission by the vehicle, and the previously recorded imagery depicting the terrain around the vehicle and generated during a previous mission by the vehicle or a second vehicle in or near the same terrain, and effectuate presentation of the imagery data corresponding to the terrain on the three dimensional topographical map based on the location, the height above the ground surface of the terrain, and the orientation of the vehicle.

A fourth aspect of present disclosure relates to a system and method for providing persistent mission data to a fleet of vehicles. The system may comprise one or more first sensors configured to generate output signals conveying information related to a location of a first vehicle, an altitude of the first vehicle, an orientation of the first vehicle, and/or other information. The system may comprise one or more second sensors configured to generate output signals conveying information related to imagery data for the terrain around the first vehicle and/or other information. The system may comprise one or more processors configured by machine-readable instructions to: receive the information related to the first vehicle's location, the altitude of the first vehicle, and the first vehicle's orientation from the one or more first sensors; receive the imagery data from the one or more second sensors disposed on the first vehicle, wherein the imagery data comprises instantaneous imagery and previously recorded imagery, the instantaneous imagery depicting the terrain around the first vehicle generated during a current mission by the first vehicle, and the previously recorded imagery depicting the terrain around the first vehicle and generated during a previous mission by the first vehicle or a second vehicle in or near the same terrain; geolocate the imagery data based on the first vehicle's altitude and the first vehicle's orientation relative to the terrain; transmit one or both of instantaneous imagery or previously recorded imagery to the fleet of vehicles; and effectuate presentation of the imagery data on a three dimensional topographical map of the terrain.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

DETAILED DESCRIPTION OF EXEMPLARY IMPLEMENTATIONS

Figure 1:
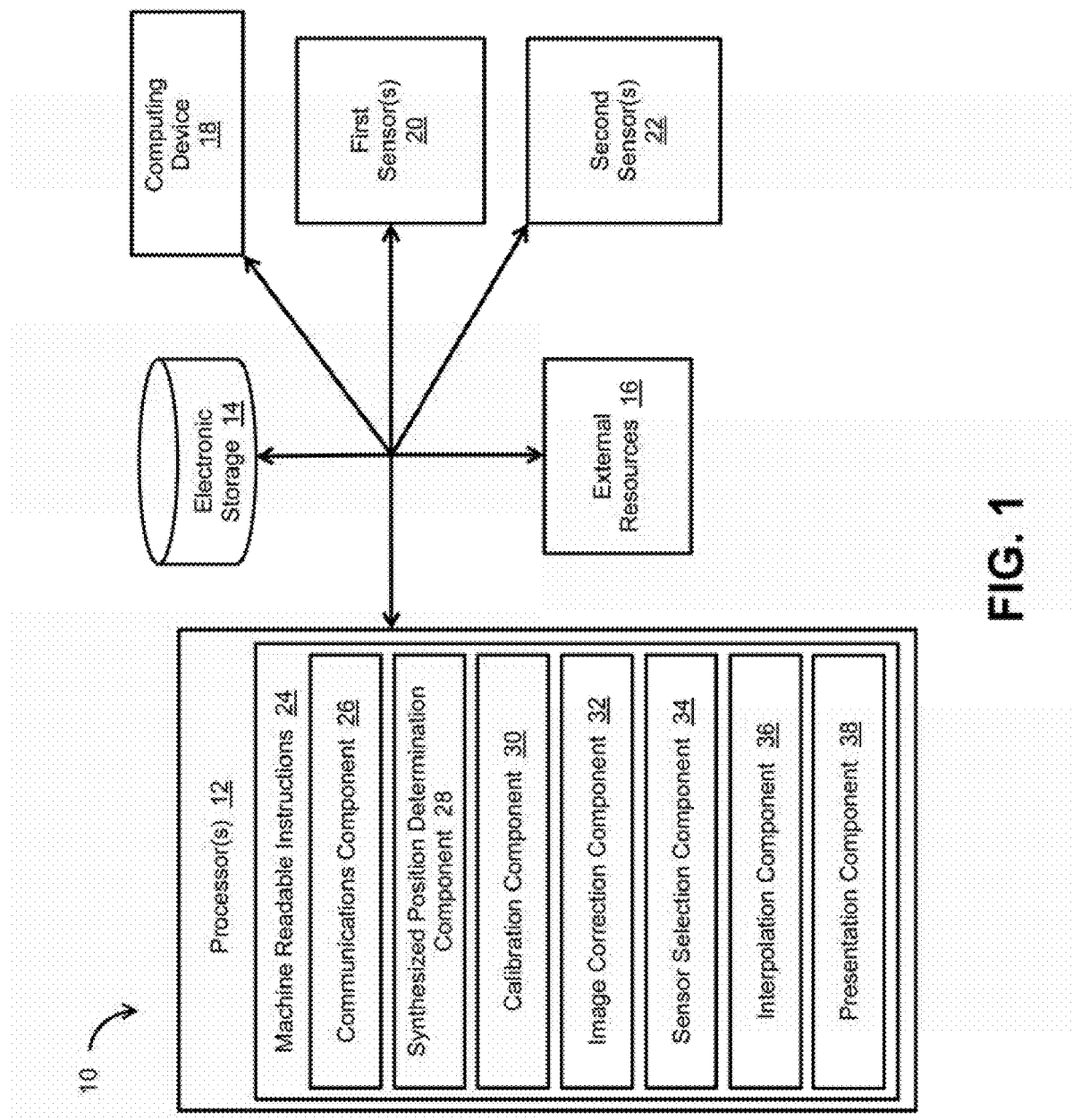
FIG. 1 is a schematic illustration of a system for facilitating data fusion, in accordance with one or more implementations.

As used herein, the singular form of "a", "an", and "the" include plural references unless the context clearly dictates otherwise. As used herein, the term "or" means "and/or" unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body. As employed herein, the statement that two or more parts or components "engage" one another shall mean that the parts exert a force against one another either directly or through one or more intermediate parts or components. As employed herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

Typical prior art systems for aircraft avionics (e.g., aircraft navigation) may include radar systems with displays, visual and infrared cameras and displays, and synthetic vision systems and displays. Such systems are usually separate and independent of each other. Use of such systems may require elevated costs as well as valuable time to evaluate the output of each separate system in a flight environment. Pilots' workload under stress of rescue, in combative environments, and/or in other situations may not allow sufficient time to investigate and interpret output from such separate systems.

Imagery obtained from multiple sensor types such as radar, visual, and infrared images in the past has been dissimilar in their respective scan rates, resolutions, and image sizes. Prior art systems typically cannot transform the data obtained from such sensors into homogeneous image data sets that may be merged visually and geolocated such that the data sets may be easily merged into complex visual displays. Furthermore, cameras capable of multispectral imaging and image processing software capable of processing disparate imaging data from a plurality of sensors is not available.

In addition, hover control may be an important control/ feedback indicator for pilot/flight safety. Sole reliance on global positioning system (GPS) information and/or inertial position sensors may not be sufficient to give a pilot of an (e.g., aerial) vehicle the fine resolution to control the vehicle. Lack of fine resolution may facilitate control of the aerial vehicle's position and attitude only to within a few feet. However, Doppler radar may be utilized (e.g., as described herein) to enhance the resolution of position and attitude control for a vehicle.

Even precision GPS equipment may only provide location information corresponding to a (e.g., aerial) vehicle within a variance of approximately 3 meters (about 9 feet). Such precision may not be sufficient for a pilot to keep the position of the vehicle constant while the aerial vehicle is adjacent to buildings or other structures. Additionally, precision GPS equipment may not be a cost effective means to improve positional accuracy due to high costs associated with such equipment.

FIG. 1 is a schematic illustration of a system 10 for facilitating data fusion. In some implementations, system 10 is configured to render one or more types of imagery and information included in signals received from one or more sensors into a composite image that provides a synthetic vision view of a terrain around a vehicle. In some implementations, the synthetic vision includes a combination of terrain three-dimensional mesh topology and satellite imagery rendered to create a realistic view of the terrain in perspective and attitude relative to a location and/or an orientation of a vehicle. In some implementations, the three-dimensional terrain is geo-located in latitude and longitude. In some implementations, the three-dimensional terrain is overlaid with one or more sensor imagery layers. In some implementations, system 10 facilitates real time transformation of imagery data to image overlay (e.g., a three-dimensional topographical map of a terrain may be overlaid with infrared, LIDAR, and/or other imagery of the terrain. For example, geolocated infrared imagery, LIDAR imagery, radar imagery, and/or other imagery of a terrain fused with a topographical map of the terrain may be presented to a helicopter pilot to provide visual assistance (e.g., enhanced vision) and precise location information during low visibility conditions. In some implementations, system 10 comprises one or more processors 12, electronic storage 14, external resources 16, computing device 18, one or more first sensors 20, one or more second sensors 22, and/or other components.

In some implementations, system 10 may include one or more field-programmable gate arrays (FPGA). For example, system 10 may include a fusion box constructed from aluminum and/or other materials. In some implementations, the fusion box is constructed without fans and/or air vents. In some implementations, the fusion box includes 12 slots. Individual ones of the 12 slots may be configured to interface with an FPGA and/or other electronics. In this example, 2 slots may be configured to interface with power supplies, one slot may be configured to interface with a network switch, and the remaining 9 slots may include one or more of (i) digitizers configured to receive raw imagery, pre-process the imagery, and place the processed imagery (e.g., infrared primitive streams) on a data bus to facilitate access to the imagery by other interfaces; (ii) display generators configured to digitally composite imagery data onto a viewing screen (e.g., display device); (iii) fusion boards configured to perform data mixing, data rotations, data translations, and/or other tasks; or (iv) processor boards.

In some implementations, one or more vehicles are be outfitted with system 10. In some implementations, the one or more vehicles include land, aerial, and/or other vehicles. For example, aerial vehicles may include one or more of helicopters (e.g., BlackHawk, Chinook, etc.), airplanes (e.g., commercial jets, fighter jets, etc.), unmanned aerial vehicles (e.g., drones, etc.), and/or other aerial vehicles. In some implementations, land vehicles may include jeeps, tanks, and/or other land vehicles.

In some implementations, one or more first sensors 20 are configured to generate output signals conveying information related to a location of the vehicle, a height of the vehicle above a ground surface of terrain around the vehicle (e.g., altitude), an orientation of the vehicle (e.g., attitude), and/or other information. In some implementations, one or more first sensors 20 include one or more of a radar altimeter, a GPS, an attitude indicator, electronic flight instrument systems, and/or other sensors.

Figure 2:
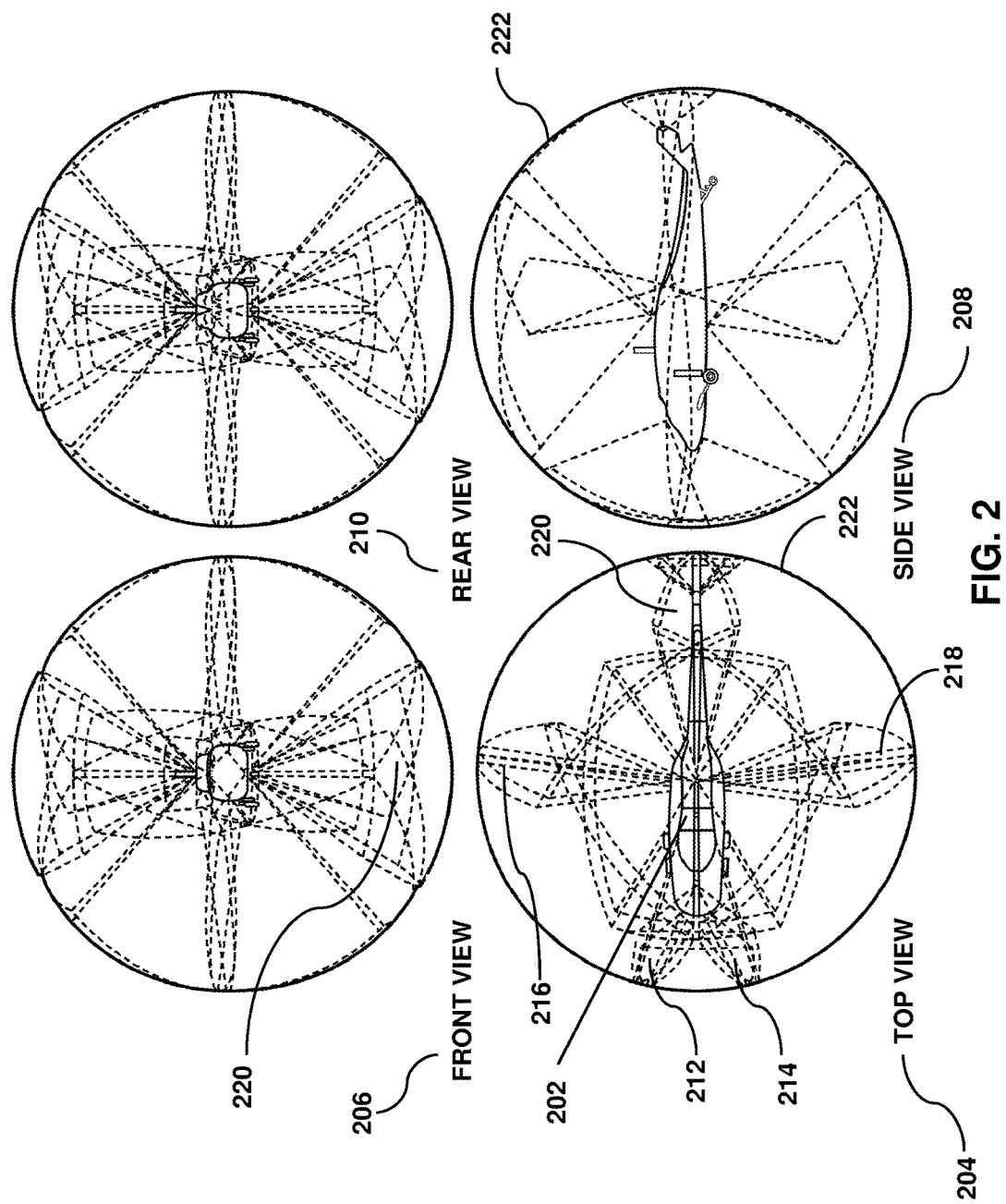
FIG. 2 illustrates one or more views of sensors disposed on an aerial vehicle, in accordance with one or more implementations.

In some implementations, one or more second sensors 22 are configured to generate output signals conveying information related to imagery data for the terrain around the vehicle. In some implementations, one or more second sensors 22 include one or more of infrared (IR) cameras, visible cameras, a millimeter wave radar, a LIDAR, and/or other sensors. In some implementations, one or more second sensors 22 are positioned at predetermined angles relative to the vehicle. For example, seven IR sensors may be disposed above the vehicle, and seven IR sensors may be disposed below the vehicle to provide a continuous hemispherical coverage of terrain and/or objects around the vehicle. In some implementations, individual IR sensors are disposed such that a maximum overlapping coverage of the external spherical field of view is provided. By way of a non-limiting example, FIG. 2 illustrates views of one or more second sensors 22 (not labeled in FIG. 2) disposed on an aerial vehicle 202, in accordance with one or more implementations. FIG. 2 illustrates a top view 204, a front view 206, a side view 208, and a rear view 210 of vehicle 202. As shown in FIG. 2, overlapping coverage of individual sensor views 212, 214, 216, 218, 220, and/or other views results in a hemispherical or spherical coverage 222 of all of the area around the aerial vehicle.

Returning to FIG. 1, computing device 18 is configured to provide an interface between one or more vehicle operators and system 10. In some implementations, computing device 18 is associated with individual pilots, co-pilots, drivers, and/or other users. Computing device 18 is configured to provide information to and/or receive information from the one or more vehicle operators and/or other users. Computing device 18 includes a user interface and/or other components. The user interface may be and/or include a graphical user interface configured to present the one or more vehicle operators with views and/or fields configured to receive entry and/or selection of information related to a terrain and/or provide and/or receive other information. In some implementations, the user interface includes a plurality of separate interfaces associated with a plurality of computing devices 18, processor 12, and/or other components of system 10.

In some implementations, computing device 18 is configured to provide the user interface, processing capabilities, databases, and/or electronic storage to system 10. As such, computing device 18 may include processor 12, electronic storage 14, external resources 16, and/or other components of system 10. In some implementations, computing device 18 is connected to a network (e.g., the internet). In some implementations, computing device 18 does not include processor 12, electronic storage 14, external resources 16, and/or other components of system 10, but instead communicates with these components via the network. The connection to the network may be wireless or wired. In some implementations, computing devices 18 are laptops, desktop computers, smartphones, tablet computers, and/or other computing devices.

Examples of interface devices suitable for inclusion in the user interface include a camera, a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that computing device 18 includes a removable storage interface. In this example, information may be loaded into computing device 18 from removable storage (e.g., a smart card, a flash drive, a removable disk) that enables vehicle operators and/or other users to customize the implementation of computing device 18. Other exemplary input devices and techniques adapted for use with computing device 18 and/or the user interface include, but are not limited to, an RS-232 port, RF link, an IR link, a modem (telephone, cable, etc.) and/or other devices.

Processor 12 is configured to provide information processing capabilities in system 10. As such, processor 12 may comprise one or more of a digital processor, an analog processor, a digital circuit designed to process information, an analog circuit designed to process information, a state machine, and/or other mechanisms for electronically processing information. Although processor 12 is shown in FIG. 1 as a single entity, this is for illustrative purposes only. In some implementations, processor 12 may comprise a plurality of processing units. These processing units may be physically located within the same device (e.g., a server), or processor 12 may represent processing functionality of a plurality of devices operating in coordination (e.g., one or more servers, computing device 18, devices that are part of external resources 16, electronic storage 14, and/or other devices.)

In some implementations, processor 12, electronic storage 14, external resources 16, computing device 18, and/or other components may be operatively linked via one or more electronic communication links. For example, such electronic communication links may be established, at least in part, via a network such as the Internet, and/or other networks. It will be appreciated that this is not intended to be limiting, and that the scope of this disclosure includes implementations in which these components may be operatively linked via some other communication media. In some implementations, processor 12 is configured to communicate with electronic storage 14, external resources 16, computing device 18, and/or other components according to a client/server architecture, a peer-to-peer architecture, and/or other architectures.

As shown in FIG. 1, processor 12 is configured via machine-readable instructions 24 to execute one or more computer program components. The one or more computer program components may comprise one or more of a communications component 26, a synthesized position determination component 28, a calibration component 30, an image correction component 32, a sensor selection component 34, an interpolation component 36, a presentation component 38, and/or other components. Processor 12 may be configured to execute components 26, 28, 30, 32, 34, 36 and/or 38 by software; hardware; firmware; some combination of software, hardware, and/or firmware; and/or other mechanisms for configuring processing capabilities on processor 12.

It should be appreciated that although components 26, 28, 30, 32, 34, 36, and 38 are illustrated in FIG. 1 as being co-located within a single processing unit, in implementations in which processor 12 comprises multiple processing units, one or more of components 26, 28, 30, 32, 34, 36, and/or 38 may be located remotely from the other components. The description of the functionality provided by the different components 26, 28, 30, 32, 34, 36, and/or 38 described below is for illustrative purposes, and is not intended to be limiting, as any of components 26, 28, 30, 32, 34, 36, and/or 38 may provide more or less functionality than is described. For example, one or more of components 26, 28, 30, 32, 34, 36, and/or 38 may be eliminated, and some or all of its functionality may be provided by other components 26, 28, 30, 32, 34, 36, and/or 38. As another example, processor 12 may be configured to execute one or more additional components that may perform some or all of the functionality attributed below to one of components 26, 28, 30, 32, 34, 36, and/or 38. Furthermore, the described implementation is simply one embodiment but other manners of implementation can also be used with the inventive methods and systems described herein.

In some implementations, communications component 26 is configured to receive information related to the vehicle's location, the height above the ground surface of the terrain, and the vehicle's orientation from one or more first sensors 20. In some implementations, communications component 26 is configured to receive information related to the vehicle's location, altitude, and orientation continuously, periodically (e.g., every minute, every 15 minutes, etc.), and/or other time intervals. In some implementations, communications component 26 is configured to obtain telemetry data (e.g., information related to the vehicle's location, the height above the ground surface of the terrain, and the vehicle's orientation from one or more first sensors 20) at one or more of 30 frames per second (FPS), 60 FPS, and/or other sampling rates. In some implementations, communications component 26 is configured to obtain a three dimensional topographical map of the terrain based on the location of the vehicle. In some implementations, the three dimensional topographical map includes satellite imagery of the terrain fused with terrain three-dimensional mesh topology. In some implementations, communications component 26 is configured to divide the three dimensional topographical map into a virtual equilateral grid. In some implementations, the grid extends to the limit of the perspective vanishing point. In some implementations, the grid includes a first vertex. In some implementations, the terrain includes a first point corresponding to the first vertex.

In some implementations, communications component 26 is configured to receive the imagery data from one or more second sensors 22. In some implementations, communications component 26 is configured to obtain IR imagery at one or more of 30 FPS, 60 FPS and/or other sampling rates. In some implementations, communications component 26 is configured to receive LIDAR imagery at 10 to 100 million points per second. In some implementations, communications component 26 is configured to receive return echo signals from the millimeter wave radar at a rate defined by the fifth order of magnitude (e.g., a $\times 10^5$). In some implementations, communications component 26 is configured to obtain visible camera imagery at one or more of 30 FPS, 60 FPS and/or other sampling rates. In some implementations, the imagery data includes a first pixel corresponding to the first point in the terrain. In some implementations, the imagery data includes instantaneous imagery and previously recorded imagery. In some implementations, the imagery is obtained in one or more missions. In some implementations, the one or more missions include one or more vehicle operation sessions (e.g., a vehicle traveling from an origin to a destination). In some implementations, the one or more missions include one or more of aerial, sea, or land maneuvers, campaigns, and/or other actions by one or more vehicles. For example, a mission may include reconnaissance of a terrain for obtaining information regarding activities and resources of an enemy or potential enemy, meteorologic, hydrographic, and/or geographic characteristics of a particular area and/or other information. In some implementations, the instantaneous imagery depicts the terrain around the vehicle generated during a current mission by the vehicle. In some implementations, the current mission includes an in-progress mission and/or other present vehicle operation sessions. In some implementations, the previously recorded imagery depicts the terrain around the vehicle generated during a previous mission by the vehicle or a second vehicle in or near the same terrain.

In some implementations, communications component 26 is configured to receive information related to meteorological conditions for the environment around the vehicle. In some implementations, communications component 26 is configured to determine information related to meteorological conditions for the environment around the vehicle based on information received from satellite imagery, National Weather Service, NOAA, and/or other external resources (e.g., visual inspection, weather channel, etc.). In some implementations, communications component 26 is configured to receive information related to meteorological conditions continuously, periodically (e.g., every hour, every two hours, etc.), prior to a mission, and/or other time intervals. In some implementations, the information related to meteorological conditions includes information indicating one or both of a whiteout or a brownout. In some implementations, white out and/or brown out conditions include dust, snow, water, ash or other particulates in the environment that may be disturbed by the vehicle and cause a restriction of vision to a point where normal duties are affected. In some implementations, the information related to meteorological conditions includes information indicating one or more particulates having one or more dimensions. In some implementations, the information related to meteorological conditions includes information indicating one or more particulates having one or more optical properties. For example, the one or more particulates may include water vapor having a particular reflectance. As another example, the one or more particulates may include sand having a particular grain size, color, density, composition and/or other properties.

Mission data may be gathered during a mission. For example, mission data may include data related to changes in terrain, data related to appearance of new object, data related to terrestrial movement by mobile personnel, and/or other data. In some implementations, mission data includes one or more of instantaneous imagery, previously recorded imagery, cockpit telemetry data, vehicle path of travel, vehicle's location, vehicle's altitude, vehicle's orientation, and/or other data. Mission data may be gathered by radar, infrared cameras, and/or other sensors on each flight. In some implementations, mission data is stored on a non-transitory electronic storage medium (e.g., electronic storage 14), saved in a cloud storage, transmitted to a ground station and/or otherwise kept. The accumulation of pertinent mission data sets may not have been historically easy to categorize and redistribute to other vehicles (e.g., aircraft) in a fleet in a timely fashion. For example, mission data may have been gathered on each mission over the same terrain over time, but may not have been redeployed in a timely manner, much less on the very next mission. In some implementations, redeployment of mission data includes utilization of geo-located mission data in subsequent missions including vehicle operations over the same latitude and longitude positions. In some implementations, mission data redeployment includes displaying the new geolocated mission data as overlay tiles in one or more displays (described below). In some implementations, mission data redeployment provides additional information to the vehicle operator by highlighting and/or annotating the new geolocated mission data (described below). For example, additional information may include chronology of changes in background and overlay terrains. In some implementations, system 10 includes an upgrade port configured to interface with a non-transitory electronic storage medium to facilitate mission data redeployment.

In some implementations, communications component 26 is configured to transmit one or more of instantaneous imagery, previously recorded imagery, cockpit telemetry data, vehicle path of travel, vehicle's location, vehicle's altitude, vehicle's orientation, and/or other data to a fleet of vehicles. In some implementations, communications component 26 is configured to transmit the one or more of instantaneous imagery, previously recorded imagery, cockpit telemetry data, vehicle path of travel, vehicle's location, vehicle's altitude, vehicle's orientation, and/or other data wirelessly (e.g., via military secure communication network), via a non-transitory electronic storage medium (e.g., USB flash drive—described below), and/or other communications means. By way of contrast, current methods for disseminating mission data include verbal and/or printed mission information presented in a briefing format. The briefings may include PowerPoints, pictures and data obtained from an earlier mission. The briefing may include way points indicating stopping points. Vehicle operators may manually set up the flight management systems based on data obtained through ground check.

Synthesized position determination component 28 is configured to determine the synthesized position of the vehicle. In some implementations, the synthesized position of the vehicle is relative to the terrain on the three dimensional topographical map. In some implementations, synthesized position determination component 28 is configured to determine the synthesized position by correlating the first pixel to the first vertex. In some implementations, the correlation is based on (i) pixel calibration information, (ii) the vehicle's height, (iii) the vehicle's orientation, and/or other information. In some implementations, the pixel calibration information includes an angular relationship between the first pixel and the first vertex (described below).

In some implementations, synthesized position determination component 28 is configured to determine a latitude and a longitude of the vehicle based on the correlation. By way of a comparison, a latitude and a longitude of the vehicle as determined by one or more first sensors 22 may be accurate to approximately 9 feet (civilian grade GPS) or 1-2 feet (military grade GPS), whereas the latitude and the longitude of the vehicle as determined by synthesized position determination component 28 may be accurate to one or more inches (e.g., less than about 12 inches) using the operations described herein.

Figure 3:
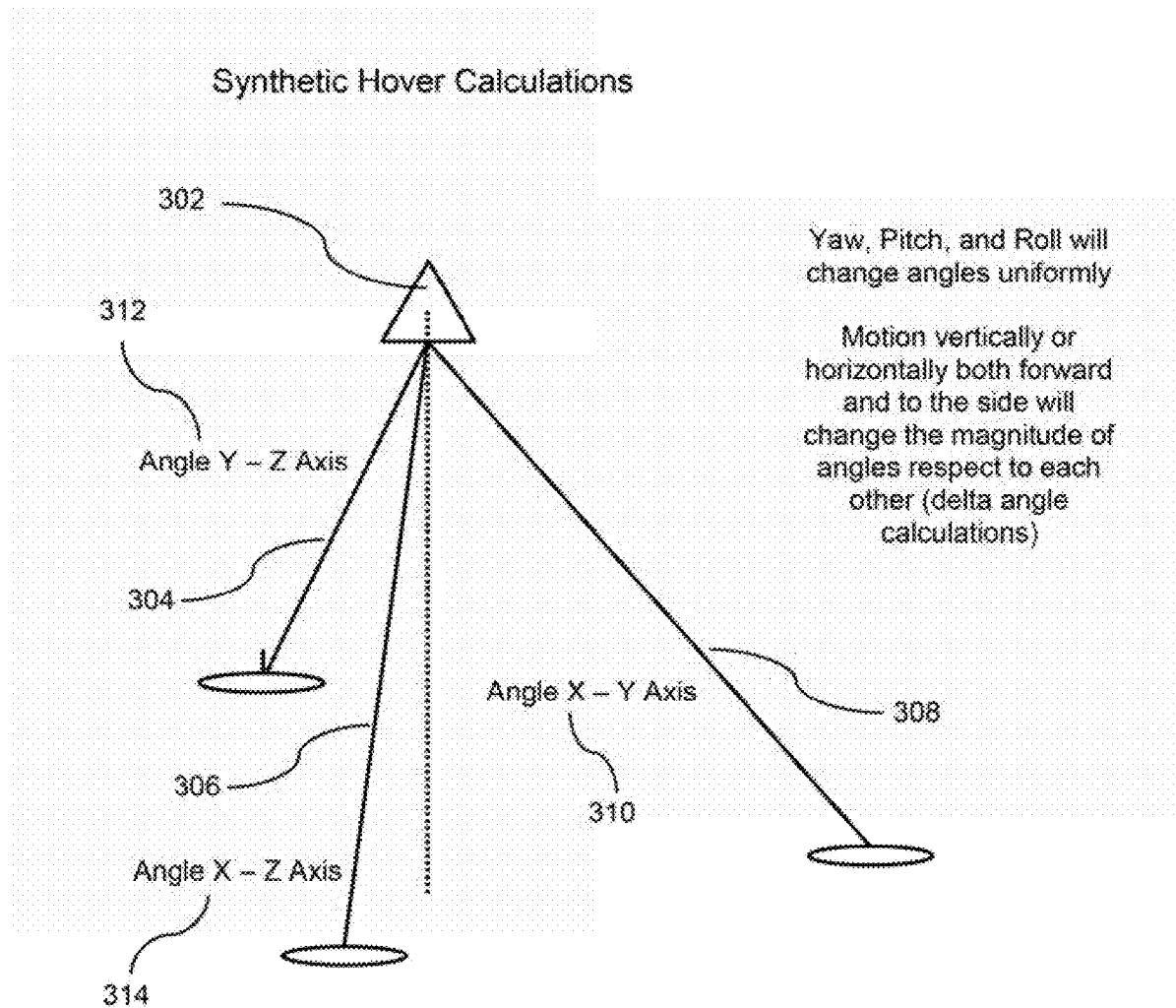
FIG. 3 illustrates mapping of spherical imagery with an angular ray from a vehicle to a position on the ground, in accordance with one or more implementations.

By way of a non-limiting example, FIG. 3 illustrates mapping of spherical imagery with an angular ray from a vehicle to a position on the ground, in accordance with one or more implementations. It can be seen in FIG. 3 that a specific ray (e.g., rays 304, 306, 308) may be drawn from the vehicle's frame of reference 302 in two angles (x and y from straight down, e.g., angles 310, 312, 314) that intersects with the terrain grid map. These angles may be measured from the vehicle and may be modified based on pitch, roll, and/or yaw of the vehicle, and/or other information. In some implementations, synthesized position determination component 28 is configured to subtract one or more of pitch, roll, or yaw from the vehicle's orientation. For example, since pixel calibration information is obtained with sensors placed parallel with the horizon (described below), synthesized position determination component 28 is configured to subtract one or more of pitch, roll, or yaw from the vehicle's orientation such that the vehicle's resultant orientation is level with the horizon. In some implementations, synthesized position determination component 28 (FIG. 1) is configured to determine which cross sectional grid lines are intersected with a ray from the vehicle when reaching the grid on the ground surface of the terrain. In some implementations, synthesized position determination component 28 is configured to determine a set of databases including ray angles at each altitude and the corresponding x and y location (latitude and longitude) on the ground surface of the terrain. As such, synthesized position determination component 28 may facilitate mapping of the spherical imagery with the angular ray from the vehicle to a position on the ground surface of the terrain.

In some implementations, synthesized position determination component 28 (FIG. 1) is configured to subtract active yaw, pitch, and roll information corresponding to the vehicle from the changes in angular relationships relative to the terrain in order to determine a vehicle drift. In some implementations, the vehicle drift may correlate with a change in perspective. In some implementations, responsive to the correlation between the vehicle drift and the change in perspective, synthesized position determination component 28 is configured to provide a feedback control to a vehicle operator in order to facilitate maintaining an exact position.

Figure 4:
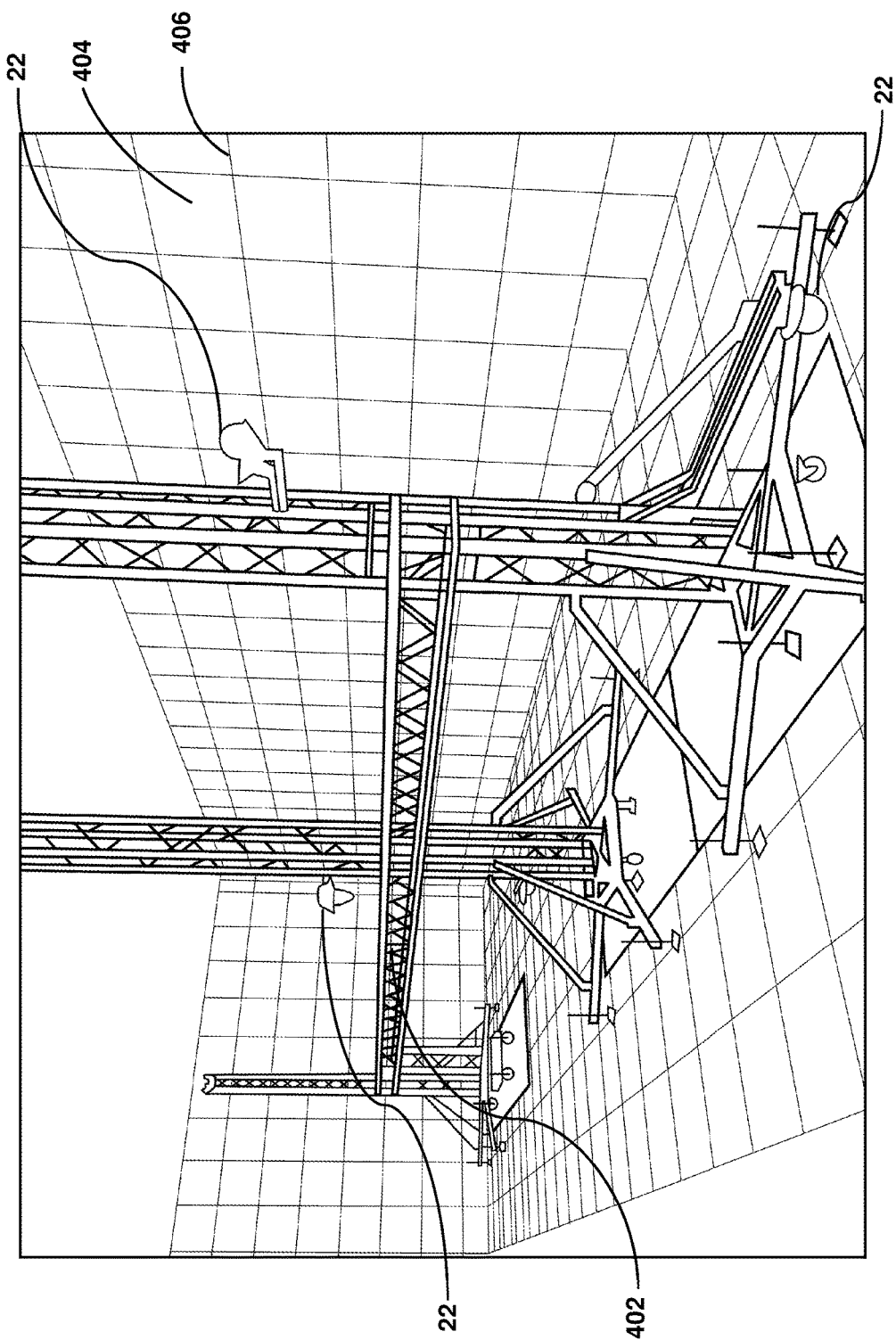
FIG. 4 illustrates an apparatus for imaging a grid having thermally reflective and retentive properties, in accordance with one or more implementations

Returning to FIG. 1, calibration component 30 is configured to determine the pixel calibration information. As described above, the pixel calibration information includes an angular relationship between the first pixel and the first vertex. In some implementations, calibration component 30 is configured such that the pixel calibration information is determined in a calibration area, the area comprising (i) a floor, walls, and a ceiling constructed from a background heat absorbing material and (ii) a pattern of intersecting stainless steel bars forming a grid having thermally reflective and thermally retentive properties. In some implementations, individual ones of one or more second sensors 22 target a portion of the grid. In some implementations, an apparatus is set up in the area to place one or more second sensors 22 above or below the apparatus structure to emulate their placement on a vehicle. In some implementations, such sensor placement enables translations and transformations of one or more second sensors 22 not being placed in the same locations. In some implementations, a field of view corresponding to individual ones of one or more second sensors 22 is measured and recorded. By way of a non-limiting example, FIG. 4 illustrates an apparatus for imaging a grid having thermally reflective and retentive properties, in accordance with one or more implementations. As shown in FIG. 4, an erector set 402 is placed in an area. In some implementations, the area has been precisely measured and fixed such that the walls are orthogonal. In some implementations, the walls are outfitted with thermally absorptive panels 404. In some implementations, a metal mesh 406 is laid out against thermally absorptive panels 404. In some implementation, one or more second sensors 22 are configured to obtain one or more images corresponding to a portion of the grid. In some implementations, pixel locations for each image obtained by one or more second sensors 22 are identified with reference to the matrix that's on the walls. In some implementations, the grid is visible in individual ones of the IR sensors field of view. In some implementations, calibration component 30 is configured to plot the field of view corresponding to individual ones of one or more second sensors 22 on the grid corresponding to the calibration area. In some implementations, calibration component 30 is configured such that a rectangular coverage is transformed to a spherical coverage. By way of a non-limiting example, equations listed below illustrate transformations from Cartesian coordinates to spherical coordinates.

$$\rho = \sqrt{x^2 + y^2 + z^2}$$

$$\varphi = \arctan\left(\frac{\sqrt{x^2 + y^2}}{z}\right) = \arccos\left(\frac{z}{\sqrt{x^2 + y^2 + z^2}}\right)$$

$$\theta = \arccos\left(\frac{y}{x}\right) = \arccos\left(\frac{x}{\sqrt{x^2 + y^2}}\right) = \arcsin\left(\frac{y}{\sqrt{x^2 + y^2}}\right)$$

$$\frac{\partial(\rho, \theta, \varphi)}{\partial(x, y, z)} = \begin{pmatrix} \frac{x}{\rho} & \frac{y}{\rho} & \frac{z}{\rho} \\ \frac{xz}{\rho^2\sqrt{x^2+y^2}} & \frac{yz}{\rho^2\sqrt{x^2+y^2}} & -\frac{\sqrt{x^2+y^2}}{\rho^2} \\ \frac{-y}{\sqrt{x^2+y^2}} & \frac{x}{\sqrt{x^2+y^2}} & 0 \end{pmatrix}$$

$$d\rho d\theta d\varphi = \det\frac{\partial(\rho, \theta, \varphi)}{\partial(x, y, z)} dxdydz = \frac{1}{\sqrt{x^2+y^2}\sqrt{x^2+y^2+z^2}} dxdydz$$

In some implementations, an individual digital cutout may become a composite piece of displayed imagery (described below). In some implementations, calibration component 30 is configured to translate individual pieces of views corresponding to one or more second sensors 22 and organize the pieces in a predetermined position. In some implementations, one or more second sensors 22 include field dimension data determined by calibrating each of the one or more second sensors 22 positions and their respective views.

Figure 5:
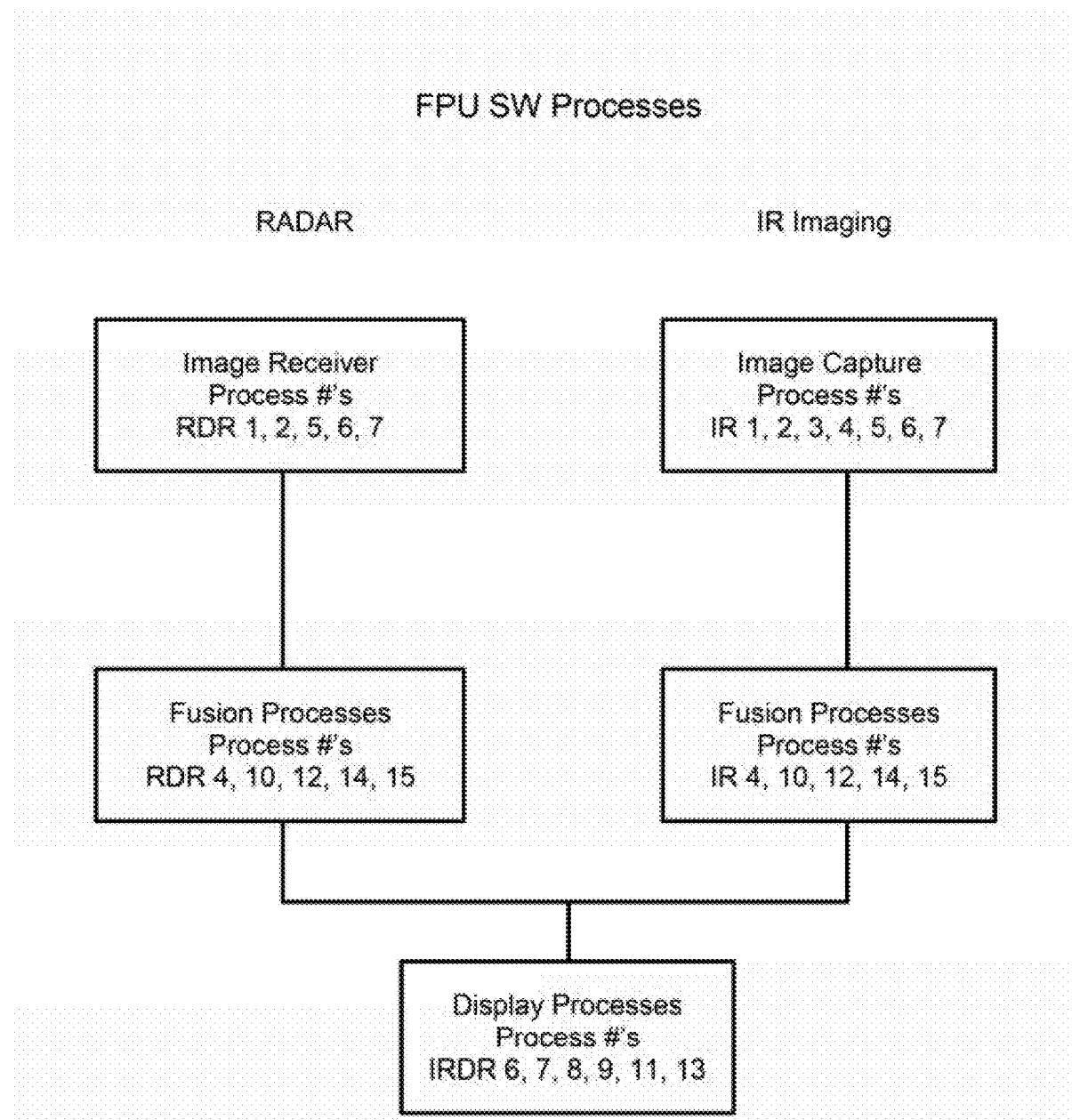
FIG. 5 illustrates an imagery software process diagram, in accordance with one or more implementations.

Returning to FIG. 1, image correction component 32 is configured to remove distortions from the imagery data. In some implementations, despite the use of precision-crafted lenses in one or more second sensors 22, the sensors constitute wide field sensors and are subject to distortions. In some implementations, the distortions include spherical distortions and/or other distortions. In some implementations, image correction component 32 is configured to cause one or more pixels of the composite views of one or more second sensors 22 to be relocated such that a plane corresponding to the composite imagery is perpendicular to the grid area on the wall. For example, one or more pixels affected by the optical distortion may be relocated such that one or more lines, rows, and/or planes created by individual pixels are parallel to the metal grid and illustrate straight rows, lines, and/or planes (e.g., a pixel's location may be moved to a correct position in the matrix). In some implementations, image correction component 32 is configured to capture a visual representation of the grid and record the distortions in a composite image. In some implementations, image correction component 32 is configured to (i) analyze the composite image, (ii) perform an inverse transform of the composite image, (iii) correct distortions present in the inverse transform, and/or perform other operations. In some implementations, image correction component 32 is configured such that the correction includes storing an image pixel at an array location that corresponds to a window x and y position of the image bit. In some implementations, additional metadata is stored for each pixel that provides the delta x and y positional shift for each pixel in the final image. By way of a non-limiting example, FIG. 5 illustrates an imagery software process diagram, in accordance with one or more implementations. The software process numbers are described in Table 1 below.

TABLE 1

IR/Radar Imaging Functions

| Process # | Process Description |
| --- | --- |
| 1 | Image Capture |
| 2 | Image Scaling and Rotation Matrices |
| 3 | Image Flattening/Pin Cushion Removal |
| 4 | Image Software Windowing |
| 5 | Image Gamma Correction (Gray Scale) |
| 6 | Image Brightness Logarithmic Compression |
| 7 | Image Brightness Logarithmic Expansion |
| 8 | Image Raster Generator |
| 9 | Image Formatting |
| 10 | Image Convolution Matrix Operator (Edge Processor) |
| 11 | Image Compositor |
| 12 | Image Hardware Windowing Engine |
| 13 | Image Z Buffer Layer Processing |
| 14 | Bayesian Algorithms |
| 15 | Kalman Filters |

In some implementations, image capture comprises taking a video analog/digital stream, synchronizing to the stream, and placing a single frame into memory.

In some implementations, image scaling and rotation matrices comprises resizing one or more images obtained from one or more second sensors 22. In some implementations, image correction component 32 is configured to determine a matrix used to perform a rotation in Euclidean space. For example, matrix defined by $$R = \begin{bmatrix} \cos\theta & -\sin\theta \\ \sin\theta & \cos\theta \end{bmatrix}$$

rotates points in the xy-Cartesian plane counter-clockwise through an angle θ about the origin of the Cartesian coordinate system.

In some implementations, image flattening/pin cushion removal comprises correcting lines, edges, and/or pixels that have been bent inward.

In some implementations, image software windowing comprises dividing up previously captured image content from multiple captures into sections that are subsequently processed together as a group. For example, individual segments of imagery obtained via one or more second sensors 22 may be assembled into a continuous view across the division between each sensor view to facilitate panning the view across multiple sensors and providing a continuous image to a display.

In some implementations, image gamma correction comprises adjusting the overall brightness of an image. In some implementations, gamma correction comprises a nonlinear operation used to encode and decode luminance or tristimulus values in images. For example, gamma correction may be defined as $V_{out}=AV_{in}^\gamma$, wherein the non-negative real input value $V_{in}$ is raised to the power γ and multiplied by the constant A to get the output value $V_{out}$. In some implementations, image raster generator comprises producing a raster image (e.g., a bitmap) used for providing an output image.

In some implementations, image brightness logarithmic compression comprises taking a whole or part of an image and operating of the scale between dark to light pixel transitions in the image. For example, in an image having a first portion with very dark components of detail and a second portion having very bright components of detail, the dynamic range of the bright image area may be compressed.

In this example, gamma correction may be performed on the compressed image such that detail is seen in both bright and dim areas.

In some implementations, image brightness logarithmic expansion comprises taking a whole or part of an image and operating of the scale between dark to light pixel transitions in the image. For example, in an image having several areas of very dark components of detail the dynamic range of the gamma lookup tables may be expanded to only include the ranges of actual brightness values. In this example, gamma correction may be performed for a transition of only the range of the image detail spanning the dark to light image range of the display such that display contrast of dim dark to light transitions is increased.

In some implementations, image formatting comprises an image or part being placed in a section of the display and other metadata or incidental data is placed on or around the display image. In some implementations, image formatting includes stretching the image in either horizontal or vertical area to fill the screen to a border frame.

In some implementations, image convolution matrix operator facilitates edge detections. For example, when looking for an edge (e.g., one or both of a horizontal or a vertical edge), a mask (e.g., a 2-D image) may be created to convolve over the image. In this example, the mask may include (i) a slit, wherein everything to the left and right of the slit are dark and (ii) a line of white from top to bottom down the center. When the mask is convolved with the target image, any information in the original image that had geometry that represented an edge vertically would be highlighted (e.g., brighter output than the rest of the image). In some implementations, convolution is recursive and multidimensional to facilitate specific selections of masks that identify edges, shapes, and/or image details lost in the background.

In some implementations, image compositing comprises combining of visual elements from separate sources into single images to create the illusion that all those elements are parts of the same scene. For example, several images may be merged using a holdout mask (a black/white picture where black portions of the image are assigned to the first source image and white is assigned to the second source image).

In some implementations, a hardware windowing engine comprises a group of FPGA state machines to set up predefined xy1 and xy2 window corners that direct the hardware to select only the dynamic pixels that fall inside the hardware defined window and process only that part of the image. In some implementations, the hardware windowing engine facilitates downstream process (e.g., retransmission). In some implementations, the hardware windowing engine facilitates reducing image date sets for software image process that are time sensitive.

In some implementations, Bayesian algorithms use Bayes' theorem to predict the probability of a disparate set of sensor data and the correlative probability that it matches a target case. For example, a correlative match is made to the shape of a detected object in a sample image or images based on a correlation with the heat intensity (e.g., based on IR imagery data) to determine that the object in question has a high probability of being a tank in the field.

In some implementations, Kalman filtering comprises using a series of measurements observed over time that contain statistical noise and other inaccuracies and producing estimates of unknown variables that tend to be more accurate than those based on a single measurement alone, by using Bayesian inference and estimating a joint probability distribution over the variables for each timeframe. For example, Kalman filtering may facilitate displaying the historical path and the predicted future position and path of a target object (described below).

Returning to FIG. 1, sensor selection component 34 is configured to select, based on the one or more particulate dimensions and/or other information, an individual sensor from one or more second sensors 22 to provide imagery data corresponding to the terrain. In some implementations, sensor selection component 34 is configured to select, based on the one or more particulate optical properties, an individual sensor from one or more second sensors 22 to provide imagery data corresponding to the terrain. In some implementations, sensor selection component 34 is configured to automatically switch, based on the information related to meteorological conditions (e.g., the particulate size) and/or other information, between one or more second sensors 22 such that continuous terrain imagery is provided. For example, responsive to information related to meteorological conditions being indicative of fog, sensor selection component 34 is configured to switch between views corresponding to radar, IR, LIDAR, and/or other sensors such that a view of an individual one of one or more second sensors 22 and/or a fused view of one or more second sensors 22 that is unobstructed and/or unaffected by the meteorological conditions is provided to the vehicle In some implementations, sensor selection component 34 is configured to recommend, based on the meteorological conditions, manual selection of an individual sensor of the one or more sensors to the vehicle operator. For example, the meteorological conditions may include water vapor. In this example, responsive to the water vapor reaching a particular size and a particular density, the IR sensors may depict thermal reflections of the water. As such, sensor selection component 34 may select LIDAR to provide the terrain imagery. In some implementations, sensor selection component 34 is configured to determine a LIDAR light frequency unobstructed by the meteorological conditions.

In some implementations, sensor selection component 34 is configured such that the imagery data includes one or more terrain views obtained at sensor angles for one or more second sensors 22 that are fixed relative to the vehicle. For example, a helicopter may fly along a terrain and provide changing imagery with sensors at fixed angles relative to the helicopter. In some implementations, sensor selection component 34 is configured such that the imagery data comprises one or more terrain views corresponding to a fixed location on the terrain. For example, a helicopter may fly along a terrain and continuously provide imagery data corresponding to a particular latitude and longitude on the terrain. In some implementations, the particular latitude and longitude is selected by the helicopter operator and/or other users. As another example, one or more second sensors 22 may include radar. In this example, responsive to selection of a particular latitude and longitude on the terrain, sensor selection component 34 is configured to pan the radar aperture automatically to the particular latitude and longitude regardless of the vehicle's path of travel.

In some implementations, the fleet of vehicles includes a second vehicle (e.g., a second helicopter, etc.). In some implementations, interpolation component 36 is configured to interpolate the imagery data obtained from the first vehicle based on the second vehicle's orientation and/or height relative to the terrain such that a position of an object present on the terrain is correlated with the second vehicle's orientation and/or height relative to the terrain. In some implementations, interpolation component 36 is configured such that the interpolation includes placing the object on the three dimensional topographical map of the terrain at a different altitude, orientation, and/or location for visual reference of one or more operators of the second vehicle. For example, a first helicopter flying over a terrain at a first altitude, location, and/or orientation may locate an object of interest (e.g., a jeep, a tank, etc.) on the terrain. In this example, interpolation component 36 is configured to place the object of interest on a map from a point of view of a second helicopter flying over the same terrain at a second altitude, location and/or orientation. The second altitude and/or orientation may be different from the first altitude, location, and/or orientation.

In some implementations, interpolation component 36 is configured to determine an obstruction in a field of view of an individual sensor of one or more second sensors 22 by analyzing visual information provided by the individual sensor. In some implementations, an obstruction is determined responsive to the visual information being indicative of unchanging imagery, blacked out imagery, and/or other factors. In some implementations, interpolation component 36 is configured to, responsive to a determination of obstruction in a field of view of an individual sensor of one or more second sensors 22, interpolate, via instantaneous imagery provided by the other ones of one or more second sensors 22, the imagery data presented to a user such that the obstructed field of view is filled with the interpolated imagery. In some implementations, interpolation component 36 is configured such that the interpolated imagery presents a simulated view of a combination of two or more second sensors' fields of view. In some implementations, the obstruction is eliminated in the simulated view. For example, an individual one of one or more second sensors 22 may be disposed on a top surface of a helicopter and behind the rotor shaft. As such, a field of view corresponding to the individual sensor may be occluded by the engine cowling. In this example, despite the lack of vision through the cowling, interpolation component 36 is configured to, based on imagery previously obtained from another one of one or more second sensors 22 when the helicopter was traveling, simulate the field of view occluded by the engine cowling (e.g., as if the individual sensor could see through the cowling). In some implementations, interpolation component 36 is configured to retain the simulated view until new imagery is obtained from one or more second sensors 22.

In some implementations, interpolation component 36 is configured to determine a family of angles for every mesh intersection (e.g., to the horizon) at every individual foot of altitude. For example, as described above, a map may include an equilateral mesh (grid) and calibration information relating imagery pixels to mesh intersections may be received. Determining a family of angles for every mesh intersection may include determining angles between imagery pixels and mesh intersections at one or more altitudes. In some implementations, interpolation component 36 is configured to sample every fifth, eighth, tenth, and/or other fraction of the mesh intersections and determine delta angles between two angles that facilitate identifying where a mesh intersection is. In some implementations, the fraction is determined based on a signal to noise ratio. In some implementations, interpolation component 36 is configured to divide the delta by five, eight, ten, and/or other factor and apply the delta evenly to the in-between interpolated angles. As such, interpolation component 36 is configured to facilitate (i) data reduction in a data set for a particular altitude and (ii) moving from a known data angle component to an observed angle data component that is in between the sampled data via addition or subtraction operations. In some implementations, addition and/or subtraction operations occur in processor cycled speeds.

Figure 6:
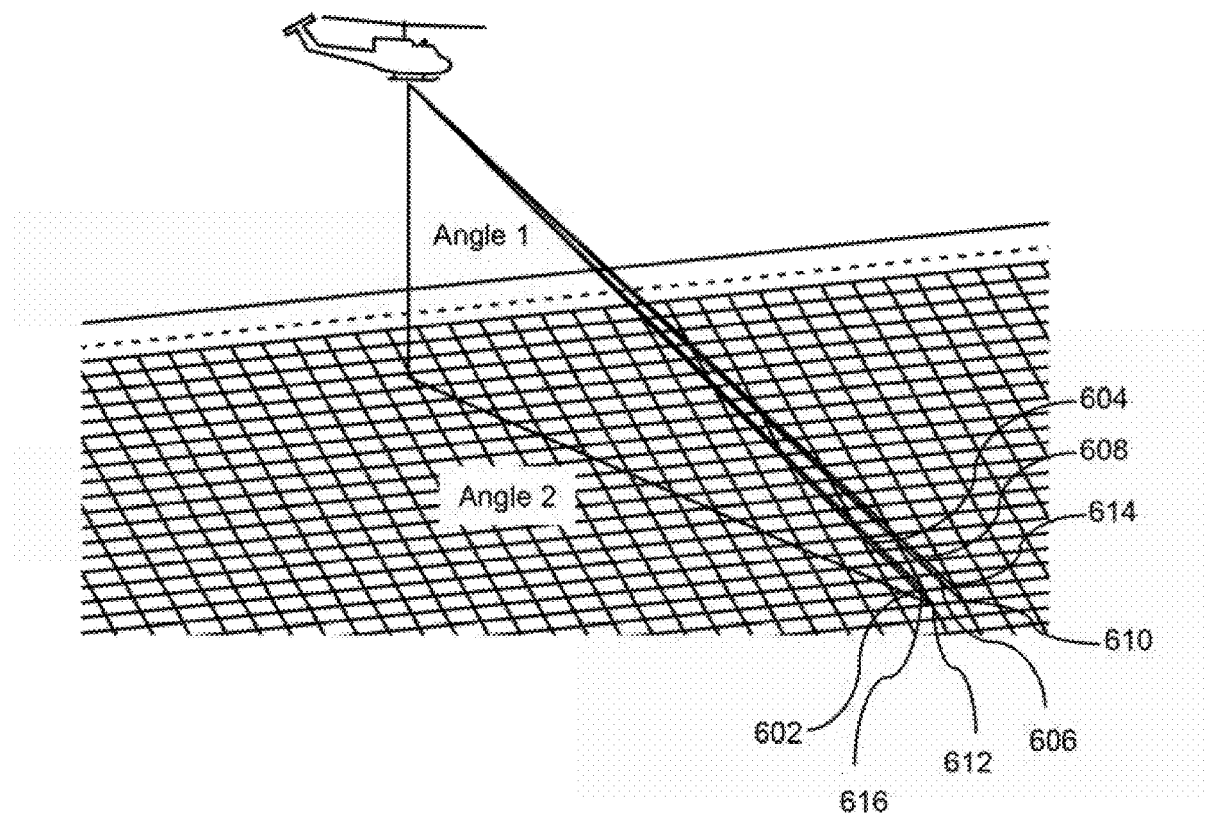
FIG. 6 illustrates angle data interpolation, in accordance with one or more implementations.

By way of a non-limiting example, FIG. 6 illustrates angle data interpolation, in accordance with one or more implementations. In FIG. 6, four rays 602, 604, 606, 608, and/or other rays are drawn to four corners of grid squares 610, 612, 614, 616, and/or other corners (e.g., on the terrain) based on the location, altitude, and/or other data pertaining to the vehicle. With angle 1 as an altitude (the angle from straight down 0 to 90 degrees) and angle 2 as an azimuth, a latitude and longitude for every square corner may be determined. As an example, a first matrix may include every computed sine cosine for both angles 1 and 2. Furthermore, a delta value describing a difference between consecutive matrix elements may be determined. In contrast, interpolation component 36 may be configured to determine an average delta value between five, eight, ten and/or other multiples of consecutive matrix elements. In some implementations, the average delta values may correspond to a transition from a first vertex to second vertex. In this example, transitioning from a first cell to a fifth cell (e.g., a first pixel to a fifth pixel) may be interpolated as the average delta value multiplied by five. For example, the average delta value may be 0.2 degrees (e.g., average difference between two consecutive cells and/or pixels). As such, transitioning from a first pixel to a fifth pixel may be interpreted as 1 degree.

Figure 7:
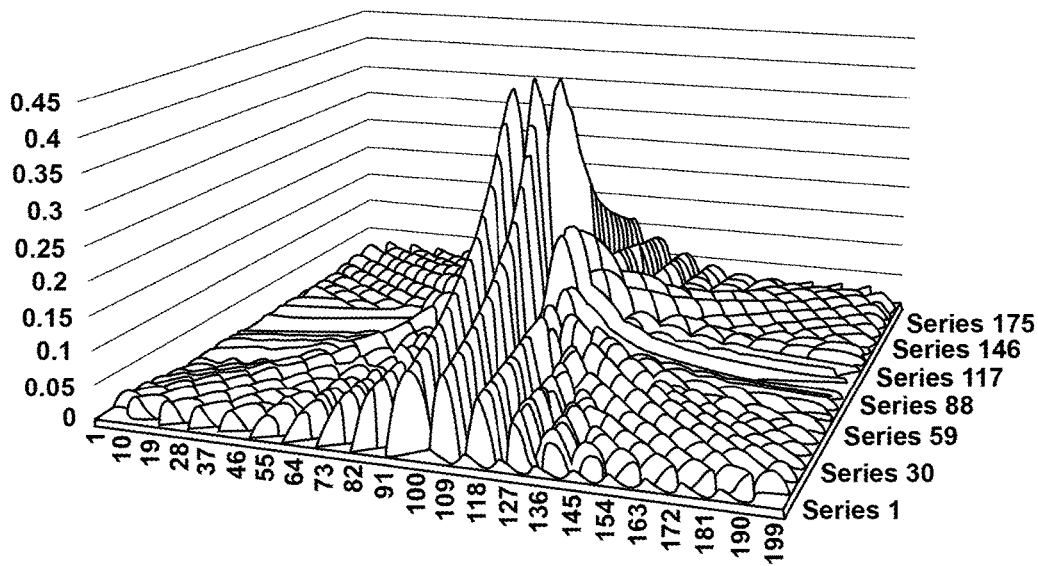
FIG. 7 illustrates error of different sampling rates at different altitudes, in accordance with one or more implementations.
Figure 7:
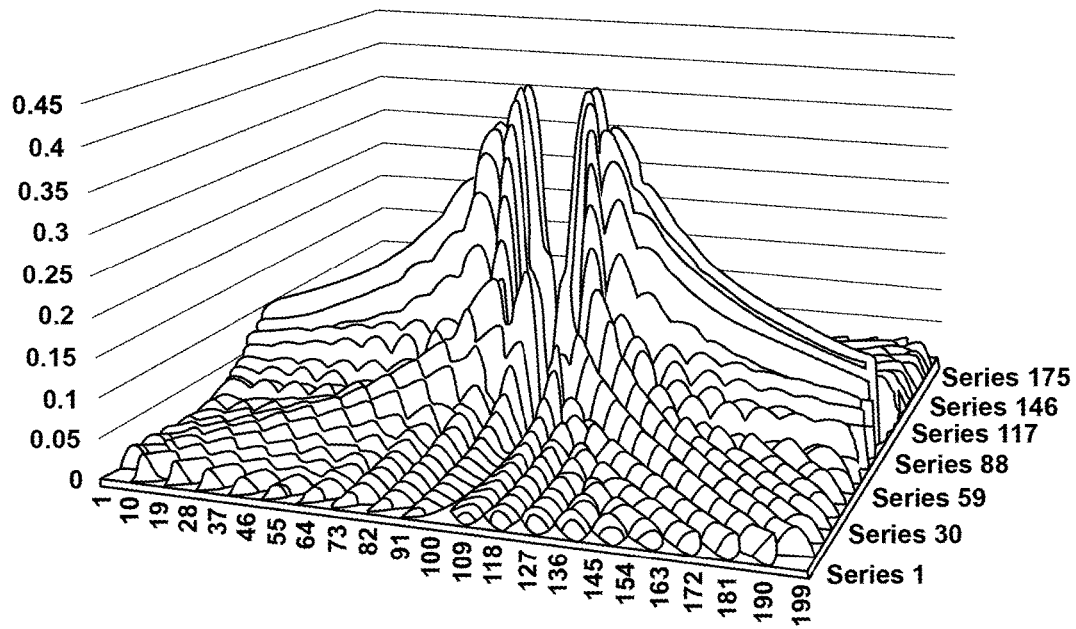

By way of a non-limiting example, FIG. 7 illustrates error of different sampling rates at different altitudes, in accordance with one or more implementations. As shown in FIG. 7, responsive to a rate of angular change with respect to one or more vertices on the grid being linear, a difference between interpolated angles and actual angles may be minimized and/or eliminated. As such, the rate of change of individual angular relationships with respect to each vertex for interpolated angles is higher in contrast to the actual angular relationships as determined based on one or more first sensors 20 responsive to the point of view of a pixel being proximate to a vertical axis. For example, an error corresponding to an interpolated angle formed proximate to an axis perpendicular to a plane defined by the terrain (e.g., an angle formed while looking straight down from a helicopter, an angle having a magnitude of less than 10 degrees, and/or other angles) is higher than an error corresponding to an interpolated angle having a value greater than a threshold value determined e.g. based on a signal to noise ratio (e.g., an angle having a magnitude greater than or equal to 20 degrees). The plots on FIG. 7 illustrate how error varies with angles formed with one or more vertices in the x-axis and the y-axis at a particular altitude. In FIG. 7, areas having the highest error indicate error rates corresponding to interpolated angles formed proximate to a vertical axis. In some implementations, interpolation component 36 is configured to (i) responsive to one or more angles formed with the mesh intersections being less than a predetermined value, determine an area below the vehicle for which actual angular data is used in determining a position of the vehicle with respect to the mesh and (ii) responsive to the one or more angles formed with the mesh intersections being greater than the predetermined value, sample every fifth, eighth, tenth, and/or other fraction of the mesh intersections and determine delta angles between consecutive angles that facilitate identifying where a mesh intersection is.

In some implementations, interpolation component is configured to compress angular data by (i) aliasing angular quadrants as ±90 degrees and (ii) aliasing sub-quadrants defined by a 45 degree angle by subtracting one or more angles from 90 degrees and/or adding the one or more angles to zero degrees.

Returning to FIG. 1, presentation component 38 is configured to effectuate presentation of the imagery data corresponding to the terrain on the three dimensional topographical map based on the location, the height above the ground surface of the terrain, the orientation of the vehicle, and/or other factors. In some implementations, presentation component 38 is configured to overlay the three dimensional topographical map with one or more of a transparent view of the imagery data, a silhouette of the imagery data, and/or other imagery views. In some implementations, presentation component 38 is configured such that the imagery data comprises one or more individual layers corresponding to individual ones of one or more second sensors 22. In some implementations, presentation component 38 is configured to facilitate viewing individual ones of the one or more layers by a vehicle operator.

In some implementations, presentation component 38 is configured to, responsive to a determination of unavailable instantaneous imagery at a particular location, effectuate presentation of previously recorded imagery corresponding to the particular location. In some implementations, previously recorded imagery is stored on a non-transitory electronic storage medium on board the vehicle, saved in cloud storage, and/or wirelessly transmitted to the vehicle. In some implementations, presentation component 38 is configured to (i) effectuate presentation of previously recorded imagery and (ii) modify the previously recorded imagery with the instantaneous imagery. For example, imagery obtained during a previous mission may be updated with imagery obtained during a current mission. In some implementations, presentation component 38 is configured to arrange previously recorded imagery in chronological layer format. In some implementations, presentation component 38 is configured to facilitate overlaying one or more of the previously recorded imagery layers to determine a change in the terrain.

In some implementations, presentation component 38 is configured to effectuate presentation of a timeline view of the imagery data corresponding to the terrain. In some implementations, the timeline view includes imagery data during a predetermined period of time. In some implementations, the timeline view is controllable by a vehicle operator to advance or withdraw the imagery data of the terrain through the predetermined period of time. In some implementations, the predetermined period of time commences responsive to a detection of a heat signature of a moving object in the terrain. In some implementations, the predetermined period of time concludes responsive to a cessation of the detection of the heat signature. For example, a vehicle covered in mud and moving along a path may not be instantaneously observed by one or more second sensors 22. In this example, despite the lack of instantaneous visual representations, presentation component 38 may be configured to effectuate presentation of the heat dissipation trail and the endpoint of the trail.

In some implementations, presentation component 38 is configured to drive at least four displays. In some implementations, presentation component 38 is configured such that the imagery data is presented on individual ones of the at least four displays independently. In some implementations, the at least four displays are configured to facilitate at least two vehicle operators to simultaneously and independently access the imagery data of the terrain. For example, each display from the at least four displays may have a different view. Each display may independently access the imagery data.

In some implementations, presentation component 38 is configured to provide a daylight view of the terrain using the imagery data regardless of a time at which the terrain is interrogated with one or more second sensors 22. For example, presentation component 38 effectuates presentation of buildings, roads, and/or other objects in a terrain in a daylight view for a vehicle operator utilizing the vehicle at night.

In some implementations, responsive to the information related to the meteorological conditions around the vehicle indicating low visibility conditions for a vehicle operator, presentation component 38 is configured to effectuate presentation of one or both of simulated views of the terrain around the vehicle and a position of the vehicle on the three dimensional topographical map to the vehicle operator based on the information related to imagery data in one or more second sensors 22 output signals, the location of the vehicle, the topographical map, and/or other information.

In some implementations, presentation component 38 is configured to facilitate, based on the received imagery data from a first vehicle, visual simulation of a travel path of the first vehicle. For example, a ground station utilizing a renderer may re-visualize, for one or more viewers on the ground, where the vehicle is and the imagery present around the vehicle.

Electronic storage 14 comprises electronic storage media that electronically stores information. The electronic storage media of electronic storage 14 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 14 may be (in whole or in part) a separate component within system 10, or electronic storage 14 may be provided (in whole or in part) integrally with one or more other components of system 10 (e.g., a computing device 18, processor 12, etc.). In some implementations, electronic storage 14 may be located in a server together with processor 12, in a server that is part of external resources 16, in computing device 18 associated with caregivers, and/or in other locations. Electronic storage 14 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 14 may store software algorithms, information determined by processor 12, information received via computing device 18 and/or other external computing systems, information received from external resources 16, and/or other information that enables system 10 to function as described herein.

External resources 16 include sources of information (e.g., databases, websites, etc.), external entities participating with system 10 (e.g., USGS, Jeppesen), one or more servers outside of system 10, a network (e.g., the internet), electronic storage, equipment related to Wi-Fi technology, equipment related to Bluetooth® technology, data entry devices, sensors, scanners, and/or other resources. In some implementations, some or all of the functionality attributed herein to external resources 16 may be provided by resources included in system 10. External resources 16 may be configured to communicate with processor 12, computing device 18, electronic storage 14, and/or other components of system 10 via wired and/or wireless connections, via a network (e.g., a local area network and/or the internet), via cellular technology, via Wi-Fi technology, and/or via other resources.

Figure 8:
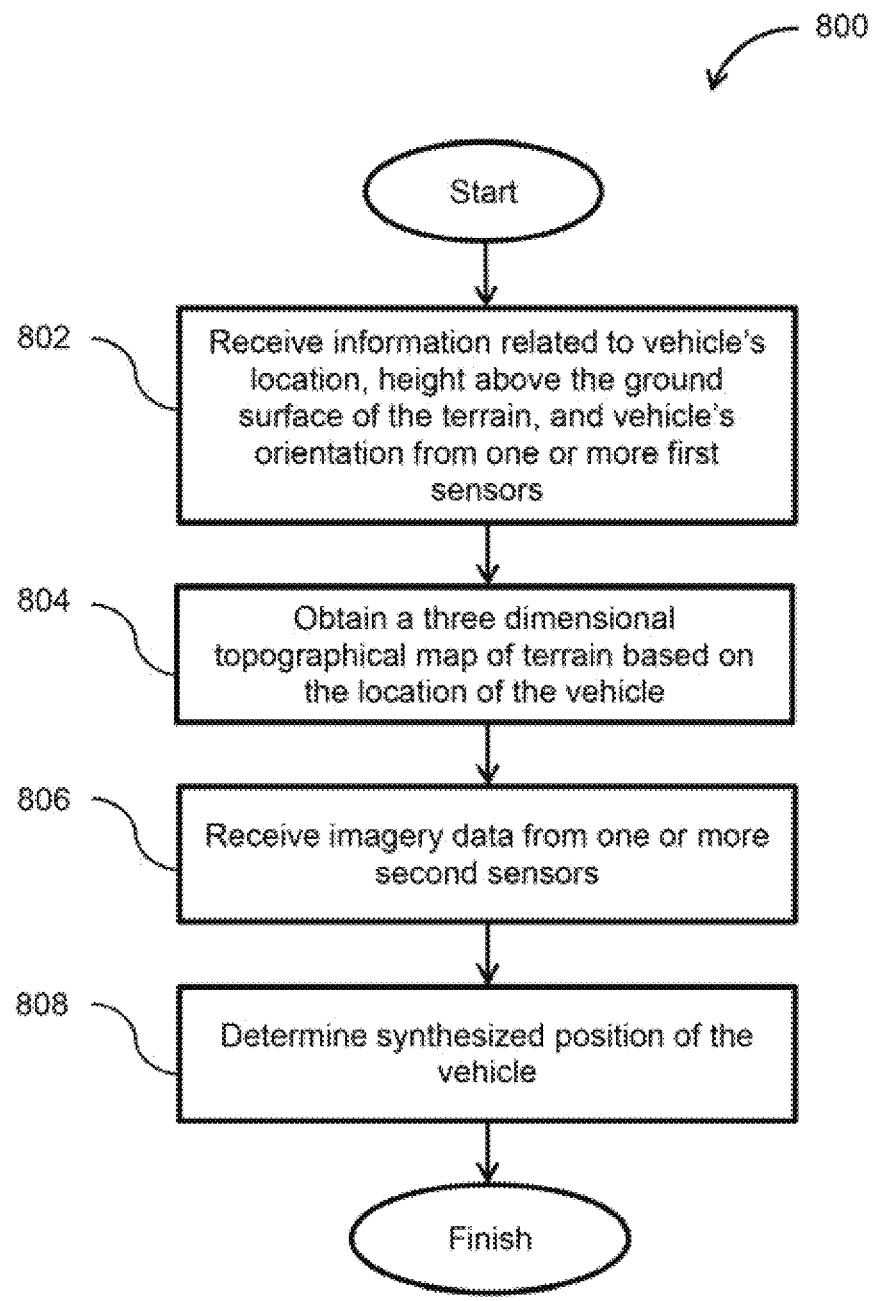
FIG. 8 illustrates a method for determining a synthesized position of a vehicle, in accordance with one or more implementations.

FIG. 8 illustrates a method 800 for determining a synthesized position of a vehicle. Method 800 may be performed with a system. The system comprises one or more first sensors, one or more second sensors, one or more processors, and/or other components. The one or more processors are configured by machine readable instructions to execute computer program components. The computer program components include a communications component, a synthesized position determination component, a calibration component, an image correction component, a sensor selection component, an interpolation component, a presentation component, and/or other components. The operations of method 800 presented below are intended to be illustrative. In some implementations, method 800 may be accomplished with one or more additional operations not described, and/or without one or more of the operations discussed. Additionally, the order in which the operations of method 800 are illustrated in FIG. 8 and described below is not intended to be limiting.

In some implementations, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At an operation 802, information related to the vehicle's location, the height above the ground surface of the terrain, and the vehicle's orientation is received from the one or more first sensors. In some implementations, operation 802 is performed by a processor component the same as or similar to communications component 26 (shown in FIG. 1 and described herein).

At an operation 804, a three dimensional topographical map of the terrain is obtained based on the location of the vehicle. In some implementations, the three dimensional topographical map may be divided into a virtual grid. In some implementations, the grid may include a first vertex. In some implementations, the terrain may have a first point corresponding to the first vertex. In some implementations, operation 804 is performed by a processor component the same as or similar to communications component 26 (shown in FIG. 1 and described herein).

At an operation 806, imagery data from the one or more second sensors is received. In some implementations, the imagery data may include a first pixel corresponding to the first point. In some implementations, operation 806 is performed by a processor component the same as or similar to communications component 26 (shown in FIG. 1 and described herein).

At an operation 808, a synthesized position of the vehicle is determined. In some implementations, the synthesized position may be relative to the terrain on the three dimensional topographical map. In some implementations, the synthesized position is determined by correlating the first pixel to the first vertex. In some implementations, the correlation is based on (i) pixel calibration information, the pixel calibration information comprising an angular relationship between the first pixel and the first vertex, (ii) the vehicle's height, and (iii) the vehicle's orientation. In some implementations, operation 808 is performed by a processor component the same as or similar to synthesized position determination component 28 (shown in FIG. 1 and described herein).

Figure 9:
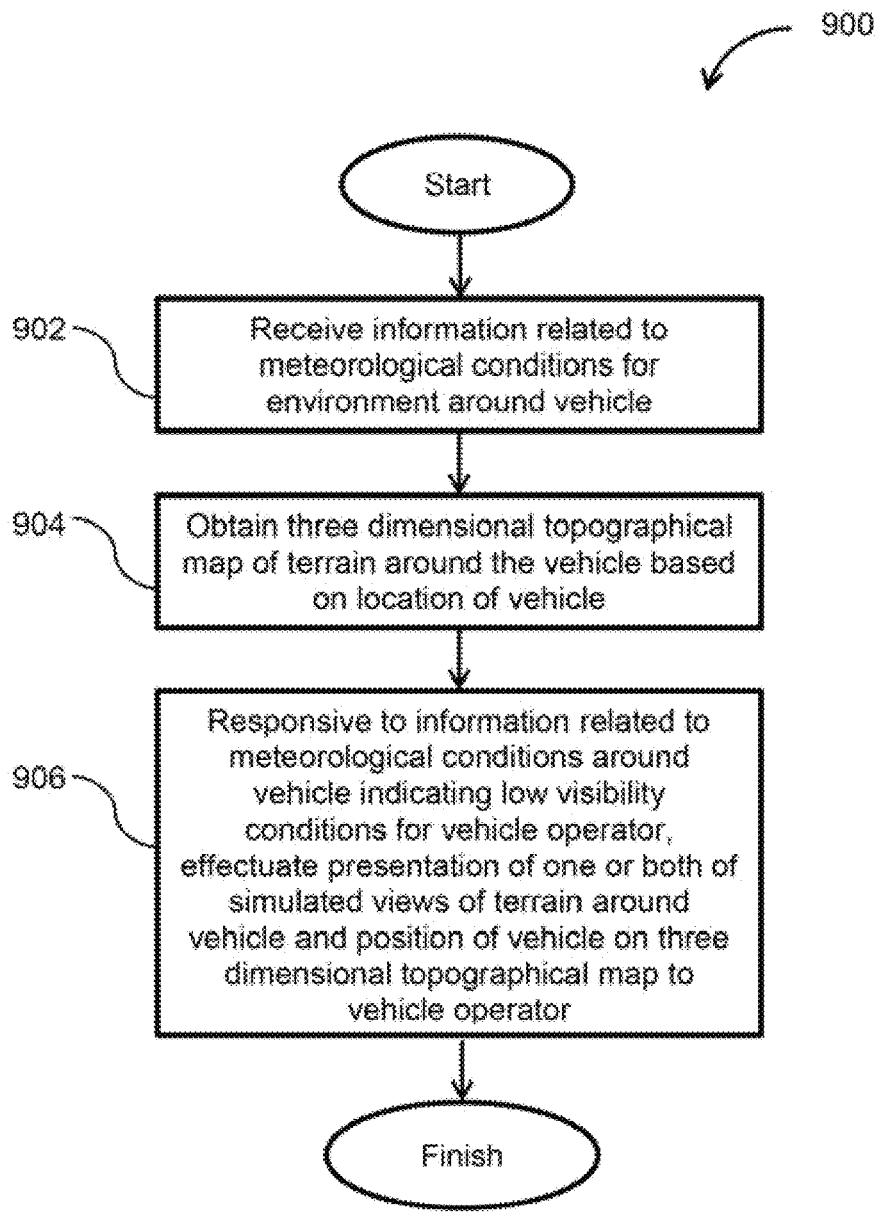
FIG. 9 illustrates a method for providing terrain imagery during low visibility conditions, in accordance with one or more implementations.

FIG. 9 illustrates a method 900 for providing terrain imagery during low visibility conditions. Method 900 may be performed with a system. The system comprises one or more sensors, one or more processors, and/or other components. The one or more processors are configured by machine readable instructions to execute computer program components. The computer program components include a communications component, a synthesized position determination component, a calibration component, an image correction component, a sensor selection component, an interpolation component, a presentation component, and/or other components. The operations of method 900 presented below are intended to be illustrative. In some implementations, method 900 may be accomplished with one or more additional operations not described, and/or without one or more of the operations discussed. Additionally, the order in which the operations of method 900 are illustrated in FIG. 9 and described below is not intended to be limiting.

In some implementations, method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At an operation 902, information related to meteorological conditions for the environment around the vehicle is received. In some implementations, operation 902 is performed by a processor component the same as or similar to communications component 26 (shown in FIG. 1 and described herein).

At an operation 904, a three dimensional topographical map of the terrain around the vehicle is obtained based on the location of the vehicle. In some implementations, operation 904 is performed by a processor component the same as or similar to communications component 26 (shown in FIG. 1 and described herein).

At an operation 906, responsive to the information related to the meteorological conditions around the vehicle indicating low visibility conditions for a vehicle operator, one or both of simulated views of the terrain around the vehicle and a position of the vehicle on the three dimensional topographical map are presented to the vehicle operator based on the information related to imagery data in the output signals, a location of the vehicle, and the topographical map. In some implementations, operation 906 is performed by a processor component the same as or similar to presentation component 38 (shown in FIG. 1 and described herein).

Figure 10:
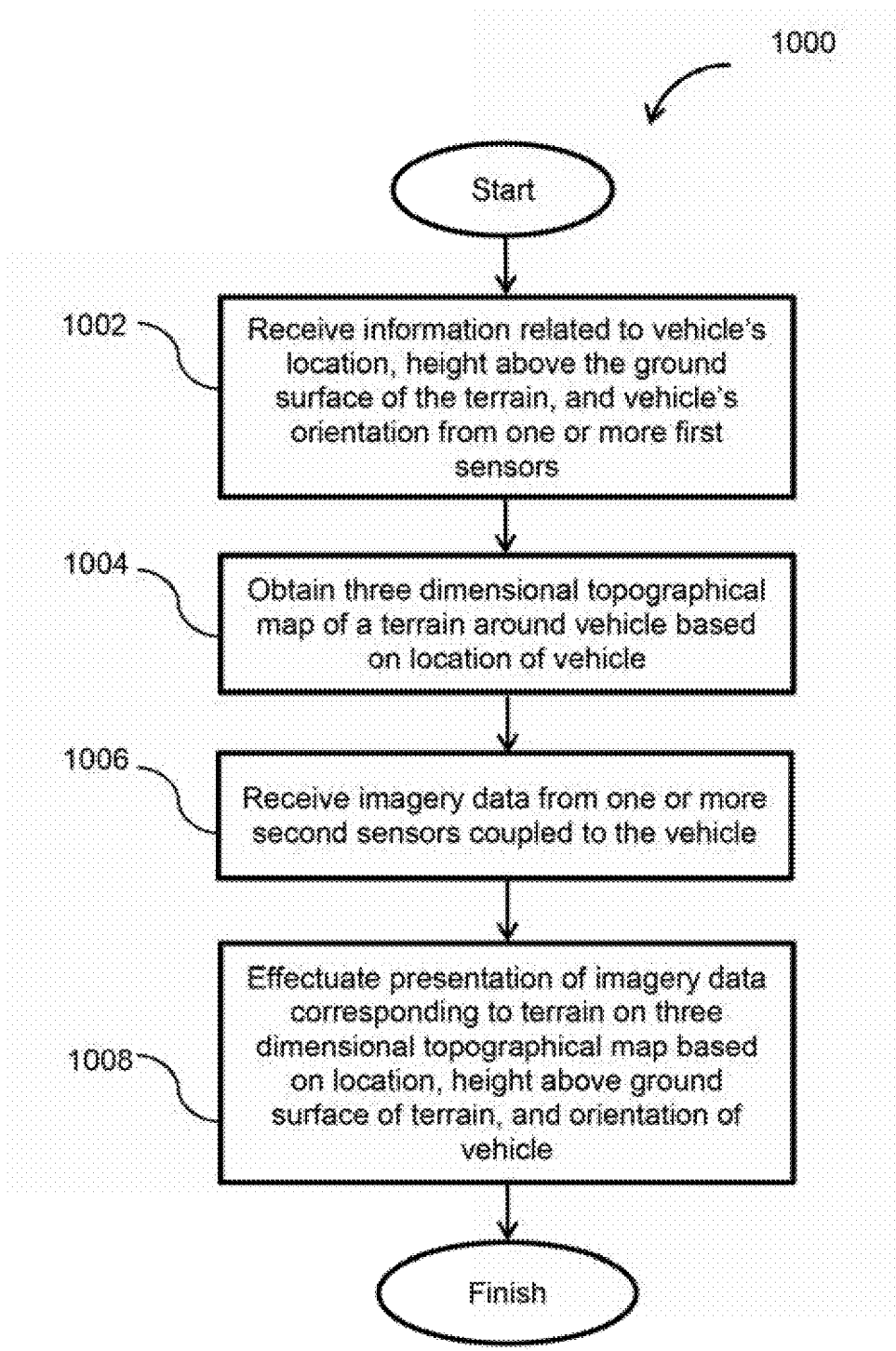
FIG. 10 illustrates a method for effectuating presentation of a terrain around a vehicle on a display in the vehicle, in accordance with one or more implementations.

FIG. 10 illustrates a method 1000 for effectuating presentation of a terrain around a vehicle on a display in the vehicle. Method 1000 may be performed with a system. The system comprises one or more second sensors, one or more processors, and/or other components. The one or more processors are configured by machine readable instructions to execute computer program components. The computer program components include a communications component, a synthesized position determination component, a calibration component, an image correction component, a sensor selection component, an interpolation component, a presentation component, and/or other components. The operations of method 1000 presented below are intended to be illustrative. In some implementations, method 1000 may be accomplished with one or more additional operations not described, and/or without one or more of the operations discussed. Additionally, the order in which the operations of method 1000 are illustrated in FIG. 10 and described below is not intended to be limiting.

In some implementations, method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

At an operation 1002, information related to the vehicle's location, the height above the ground surface of the terrain, and the vehicle's orientation is received from one or more first sensors coupled to the vehicle. In some implementations, operation 1002 is performed by a processor component the same as or similar to communications component 26 (shown in FIG. 1 and described herein).

At an operation 1004, a three dimensional topographical map of a terrain around the vehicle is obtained based on the location of the vehicle. In some implementations, operation 1004 is performed by a processor component the same as or similar to communications component 26 (shown in FIG. 1 and described herein).

At an operation 1006, imagery data from one or more second sensors coupled to the vehicle is received. In some implementations, the imagery data may correspond to the terrain. In some implementations, the imagery data may include instantaneous imagery and previously recorded imagery. In some implementations, the instantaneous imagery depicts the terrain around the vehicle generated during a current mission by the vehicle and the previously recorded imagery depicts the terrain around the vehicle and generated during a previous mission by the vehicle or a second vehicle in or near the same terrain. In some implementations, operation 1006 is performed by a processor component the same as or similar to communications component 26 (shown in FIG. 1 and described herein).

At an operation 1008, imagery data corresponding to the terrain is presented on the three dimensional topographical map based on the location, the height above the ground surface of the terrain, and the orientation of the vehicle. In some implementations, operation 1008 is performed by a processor component the same as or similar to presentation component 38 (shown in FIG. 1 and described herein).

Figure 11:
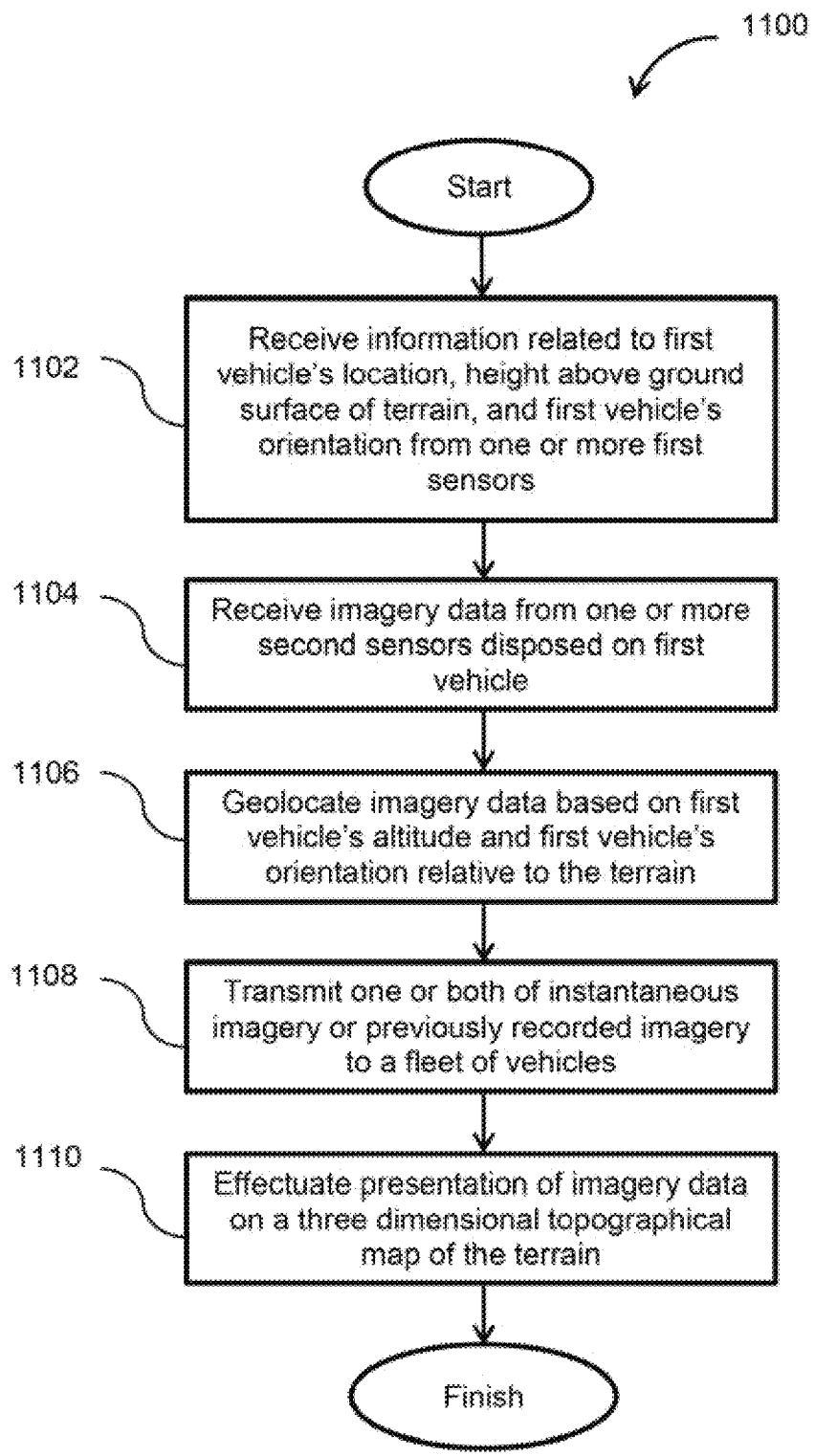
FIG. 11 illustrates a method for providing persistent mission data to a fleet of vehicles, in accordance with one or more implementations.

FIG. 11 illustrates a method 1100 for providing persistent mission data to a fleet of vehicles. Method 1100 may be performed with a system. The system comprises one or more processors, and/or other components. The one or more processors are configured by machine readable instructions to execute computer program components. The computer program components include a communications component, a synthesized position determination component, a calibration component, an image correction component, a sensor selection component, an interpolation component, a presentation component, and/or other components. The operations of method 1100 presented below are intended to be illustrative. In some implementations, method 1100 may be accomplished with one or more additional operations not described, and/or without one or more of the operations discussed. Additionally, the order in which the operations of method 1100 are illustrated in FIG. 11 and described below is not intended to be limiting.

In some implementations, method 1100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1100 in response to instructions stored electronically on an electronic storage medium. The one or more processing devices may include one or more devices configured through hardware, firmware, and/or software to be specifically designed for execution of one or more of the operations of method 1100.

At an operation 1102, information related to the vehicle's location, the height above the ground surface of the terrain, and the vehicle's orientation is received from one or more first sensors. In some implementations, operation 1102 is performed by a processor component the same as or similar to communications component 26 (shown in FIG. 1 and described herein).

At an operation 1104, imagery data from one or more second sensors disposed on a first vehicle is received. In some implementations, the imagery data may correspond to the terrain. In some implementations, the imagery data may include instantaneous imagery and previously recorded imagery. In some implementations, the instantaneous imagery depicts the terrain around the vehicle generated during a current mission by the vehicle and the previously recorded imagery depicts the terrain around the vehicle and generated during a previous mission by the vehicle or a second vehicle in or near the same terrain. In some implementations, operation 1104 is performed by a processor component the same as or similar to communications component 26 (shown in FIG. 1 and described herein).

At an operation 1106, the imagery data is geolocated based on the first vehicle's altitude and the first vehicle's orientation relative to the terrain. In some implementations, operation 1106 is performed by a processor component the same as or similar to synthesized position determination component 28 (shown in FIG. 1 and described herein).

At an operation 1108, one or both of instantaneous imagery or previously recorded imagery is transmitted to a fleet of vehicles. In some implementations, operation 1108 is performed by a processor component the same as or similar to communications component 26 (shown in FIG. 1 and described herein).

At an operation 1110, imagery data is presented on a three dimensional topographical map of the terrain. In some implementations, operation 1110 is performed by a processor component the same as or similar to presentation component 38 (shown in FIG. 1 and described herein).

Although the description provided above provides detail for the purpose of illustration based on what is currently considered to be the most practical and preferred implementations, it is to be understood that such detail is solely for that purpose and that the disclosure is not limited to the expressly disclosed implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment. Furthermore, the described implementation is simply one embodiment but other manners of implementation can also be used with the inventive methods and systems described herein.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

What is claimed is:

1. A system configured to provide persistent mission data to a fleet of vehicles, the system comprising:
   one or more first sensors configured to generate output signals conveying information related to a location of a first vehicle, an altitude of the first vehicle, and an orientation of the first vehicle;
   one or more second sensors configured to generate output signals conveying information related to imagery based location data for the terrain near the first vehicle; and
   one or more processors configured by machine-readable instructions to:
   receive the information related to the first vehicle's location, the altitude of the first vehicle, and the first vehicle's orientation from the one or more first sensors;
   receive the imagery based location data from the one or more second sensors, wherein the imagery based location data comprises instantaneous imagery based location data and previously recorded imagery based location data, the instantaneous imagery based location data conveying information related to the terrain near the first vehicle generated during a current mission by the first vehicle, and the previously recorded imagery based location data conveying information related to the terrain near the first vehicle and generated during a previous mission by the first vehicle or a second vehicle in or near the same terrain;
   geolocate the imagery based location data based on the first vehicle's altitude and the first vehicle's orientation relative to the terrain;
   transmit one or both of the instantaneous imagery based location data or previously recorded imagery based location data to the fleet of vehicles; and
   effectuate presentation of the imagery based location data on a three dimensional topographical map of the terrain;
   wherein responsive to a determination of obstruction in a field of view of an individual sensor of the one or more second sensors, the one or more processors are further configured to interpolate, via instantaneous imagery based location data provided by the other ones of the one or more second sensors, the imagery based location data presented to a user such that the obstructed field of view is filled with the interpolated imagery based location data.

2. The system of claim 1, wherein the one or more processors are configured to transmit the imagery based location data wirelessly.

3. The system of claim 1, wherein the one or more processors are configured to facilitate transmission of the imagery based location data via a non-transitory electronic storage medium.

4. The system of claim 1, wherein the one or more processors are configured such that the interpolated imagery based location data presents a simulated view of a combination of two or more second sensors' fields of view, wherein the obstruction is eliminated in the simulated view.

5. The system of claim 1, wherein the one or more processors are configured to (i) effectuate presentation of previously recorded imagery based location data from the one or more second sensors and (ii) modify the previously recorded imagery based location data with the instantaneous imagery based location data from the one or more second sensors.

6. The system of claim 1, wherein the one or more processors are further configured to arrange previously recorded imagery based location data from the one or more second sensors in chronological layer format.

7. The system of claim 6, wherein the one or more processors are further configured to facilitate overlaying one or more of the previously recorded imagery based location data layers to determine a change in the terrain.

8. The system of claim 1, wherein the one or more processors are further configured to facilitate, based on the received imagery based location data from the one or more second sensors, visual simulation of a travel path of the first vehicle.

9. A system configured to provide persistent mission data to a fleet of vehicles, the system comprising:
   one or more first sensors configured to generate output signals conveying information related to a location of a first vehicle, an altitude of the first vehicle, and an orientation of the first vehicle;
   one or more second sensors configured to generate output signals conveying information related to imagery based location data for the terrain near the first vehicle; and
   one or more processors configured by machine-readable instructions to:
      receive the information related to the first vehicle's location, the altitude of the first vehicle, and the first vehicle's orientation from the one or more first sensors;
      receive the imagery based location data from the one or more second sensors, wherein the imagery based location data comprises instantaneous imagery based location data and previously recorded imagery based location data, the instantaneous imagery based location data conveying information related to the terrain near the first vehicle generated during a current mission by the first vehicle, and the previously recorded imagery based location data conveying information related to the terrain near the first vehicle and generated during a previous mission by the first vehicle or a second vehicle in or near the same terrain;
      geolocate the imagery based location data based on the first vehicle's altitude and the first vehicle's orientation relative to the terrain;
      transmit one or both of the instantaneous imagery based location data or previously recorded imagery based location data to the fleet of vehicles; and
      effectuate presentation of the imagery based location data on a three dimensional topographical map of the terrain;
   wherein the fleet of vehicles comprises the second vehicle and wherein the one or more processors are further configured to determine, based on the second vehicle's orientation and height relative to the terrain, the imagery based location data from the one or more second sensors such that a position of an object present on the terrain is correlated with the second vehicle's orientation and height relative to the terrain; and
   wherein the one or more processors are configured such that the determination comprises placing the object on the three dimensional topographical map of the terrain at a different altitude, orientation, and location for visual reference of one or more operators of the second vehicle.

10. A system configured to provide persistent mission data to a fleet of vehicles, the system comprising:
   one or more first sensors configured to generate output signals conveying information related to a location of a first vehicle, an altitude of the first vehicle, and an orientation of the first vehicle;
   one or more second sensors configured to generate output signals conveying information related to imagery based location data for the terrain near the first vehicle; and
   one or more processors configured by machine-readable instructions to:
   receive the information related to the first vehicle's location, the altitude of the first vehicle, and the first vehicle's orientation from the one or more first sensors;
   receive the imagery based location data from the one or more second sensors, wherein the imagery based location data comprises instantaneous imagery based location data and previously recorded imagery based location data, the instantaneous imagery based location data conveying information related to the terrain near the first vehicle generated during a current mission by the first vehicle, and the previously recorded imagery based location data conveying information related to the terrain near the first vehicle and generated during a previous mission by the first vehicle or a second vehicle in or near the same terrain;
   geolocate the imagery based location data based on the first vehicle's altitude and the first vehicle's orientation relative to the terrain;
   transmit one or both of the instantaneous imagery based location data or previously recorded imagery based location data to the fleet of vehicles; and
   effectuate presentation of the imagery based location data on a three dimensional topographical map of the terrain;
   wherein the one or more processors are configured to, responsive to a determination of unavailable instantaneous imagery based location data for a particular location, effectuate presentation of previously recorded imagery based location data from one or more of the one or more second sensors for the particular location.

11. A method for providing persistent mission data to a fleet of vehicles with a system, the system comprising one or more first sensors, one or more second sensors, and one or more processors, the method comprising:

receiving, with the one or more processors, information related to a first vehicle's location, the altitude of the first vehicle, and the first vehicle's orientation from the one or more first sensors;

receiving, with the one or more processors, imagery based location data from the one or more second sensors, wherein the imagery based location data comprises instantaneous imagery based location data and previously recorded imagery based location data, the instantaneous imagery based location data conveying information related to the terrain near the first vehicle generated during a current mission by the first vehicle, and the previously recorded imagery based location data conveying information related to the terrain near the first vehicle and generated during a previous mission by the first vehicle or a second vehicle in or near the same terrain;

geolocating, with the one or more processors, the imagery based location data based on the first vehicle's altitude and the first vehicle's orientation relative to the terrain;

transmitting, with the one or more processors, one or both of the instantaneous imagery based location data or the previously recorded imagery based location data to the fleet of vehicles; and effectuating, with the one or more processors, presentation of the imagery based location data on a three dimensional topographical map of the terrain;

wherein responsive to a determination of obstruction in a field of view of an individual sensor of the one or more second sensors, the method further comprises interpolating, with the one or more processors and via instantaneous imagery based location data provided by the other ones of the one or more second sensors, the imagery based location data presented to a user such that the obstructed field of view is filled with the interpolated imagery based location data.

12. The method of claim 11, wherein the method comprises transmitting one or both of the instantaneous imagery based location data or the previously recorded imagery based location data wirelessly.

13. The method of claim 11, wherein the method comprises transmitting one or both of the instantaneous imagery based location data or the previously recorded imagery based location data via a non-transitory electronic storage medium.

14. The method of claim 11, wherein the interpolated imagery based location data presents a simulated view of a combination of two or more second sensors' fields of view, wherein the obstruction is eliminated in the simulated view.

15. The method of claim 11, wherein the method comprises (i) effectuating presentation of previously recorded imagery based location data from the one or more second sensors and (ii) modifying the previously recorded imagery based location data with the instantaneous imagery based location data from the one or more second sensors.

16. The method of claim 11, further comprising arranging, with the one or more processors, the previously recorded imagery based location data from the one or more second sensors in chronological layer format.

17. The method of claim 16, further comprising facilitating, with the one or more processors, overlaying one or more of the previously recorded imagery based location data layers to determine a change in the terrain.

18. The method of claim 11, further comprising facilitating, with the one or more processors and based on the received imagery based location data from the one or more second sensors, visual simulation of a travel path of the first vehicle.

19. A method for providing persistent mission data to a fleet of vehicles with a system, the system comprising one or more first sensors, one or more second sensors, and one or more processors, the method comprising:

receiving, with the one or more processors, information related to a first vehicle's location, the altitude of the first vehicle, and the first vehicle's orientation from the one or more first sensors;

receiving, with the one or more processors, imagery based location data from the one or more second sensors, wherein the imagery based location data comprises instantaneous imagery based location data and previously recorded imagery based location data, the instantaneous imagery based location data conveying information related to the terrain near the first vehicle generated during a current mission by the first vehicle, and the previously recorded imagery based location data conveying information related to the terrain near the first vehicle and generated during a previous mission by the first vehicle or a second vehicle in or near the same terrain;

geolocating, with the one or more processors, the imagery based location data based on the first vehicle's altitude and the first vehicle's orientation relative to the terrain;

transmitting, with the one or more processors, one or both of the instantaneous imagery based location data or the previously recorded imagery based location data to the fleet of vehicles; and effectuating, with the one or more processors, presentation of the imagery based location data on a three dimensional topographical map of the terrain;

wherein the fleet of vehicles comprises the second vehicle and wherein the method further comprises determining, with the one or more processors and based on the second vehicle's orientation and height relative to the terrain, the imagery based location data from the one or more second sensors such that a position of an object present on the terrain is correlated with the second vehicle's orientation and height relative to the terrain; and wherein the determination comprises placing the object on the three dimensional topographical map of the terrain at a different altitude, orientation, and location for visual reference of one or more operators of the second vehicle.

20. A method for providing persistent mission data to a fleet of vehicles with a system, the system comprising one or more first sensors, one or more second sensors, and one or more processors, the method comprising:

receiving, with the one or more processors, information related to a first vehicle's location, the altitude of the first vehicle, and the first vehicle's orientation from the one or more first sensors;

receiving, with the one or more processors, imagery based location data from the one or more second sensors, wherein the imagery based location data comprises instantaneous imagery based location data and previously recorded imagery based location data, the instantaneous imagery based location data conveying information related to the terrain near the first vehicle generated during a current mission by the first vehicle, and the previously recorded imagery based location data conveying information related to the terrain near the first vehicle and generated during a previous mission by the first vehicle or a second vehicle in or near the same terrain;

geolocating, with the one or more processors, the imagery based location data based on the first vehicle's altitude and the first vehicle's orientation relative to the terrain;

transmitting, with the one or more processors, one or both of the instantaneous imagery based location data or the previously recorded imagery based location data to the fleet of vehicles; and effectuating, with the one or more processors, presentation of the imagery based location data on a three dimensional topographical map of the terrain;

wherein the method further comprises, responsive to a determination of unavailable instantaneous imagery based location data for a particular location, effectuating presentation of previously recorded imagery based location data from the one or more second sensors for the particular location.

\* \* \* \* \*